US 6,774,880 B2

United States Patent
Kobayashi

(10) Patent No.: US 6,774,880 B2
(45) Date of Patent: Aug. 10, 2004

(54) PHOTO-ADDRESSABLE TYPE RECORDING DISPLAY APPARATUS

(75) Inventor: Hideo Kobayashi, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 522 days.

(21) Appl. No.: 09/878,266

(22) Filed: Jun. 12, 2001

(65) Prior Publication Data

US 2002/0005827 A1 Jan. 17, 2002

(30) Foreign Application Priority Data

Jun. 13, 2000 (JP) ...................................... 2000-177295

(51) Int. Cl.[7] .............................................. G09G 3/34
(52) U.S. Cl. .............................. 345/84; 349/2; 349/25; 315/169.1
(58) Field of Search ........................... 345/204, 81, 84; 349/2–4, 24–25, 27; 315/169.1

(56) References Cited

U.S. PATENT DOCUMENTS

| 3,902,185 A | * | 8/1975 | Hayakawa .................. 345/207 |
| 5,315,410 A | * | 5/1994 | Takanshi et al. ............. 358/471 |
| 6,452,576 B1 | * | 9/2002 | Van Velzen et al. .......... 345/82 |
| 6,600,473 B1 | * | 7/2003 | Kobayashi et al. ........... 345/97 |

FOREIGN PATENT DOCUMENTS

JP          A 10-20328           1/1998

OTHER PUBLICATIONS

"Liquid Crystal Spatial Light Modulator and Information Processing" EKISHO, vol. 2; No. 1, 1998, pp. 3–18.
Yoshida, H., Takizawa, T. et al. "Reflective Display with Photoconductive Layer and a Bistable Reflective Cholesteric Mixture" SID, 1996, Applications Digest, pp. 59–62.

Japan Hardcopy, 1996, Fall Meeting, pp. 25–28.

Applied Optics "Ferroelectric liquid–crystal spatial light modulator achieving bipolar image operation and cascadability" pp. 6859–6868.

"O plus E", 1997, No. 206, pp. 115–119.

Sid 91 Digest, Kuniharu Takizawa et al., "Polymer–Dispersed Liquid–Crystal Light Valves F rojection Displays" pp. 250–253.

* cited by examiner

Primary Examiner—Richard Hjerpe
Assistant Examiner—M. Fatahiyar
(74) Attorney, Agent, or Firm—Oliff & Berridge PLC

(57) ABSTRACT

A photo-addressable type recording display apparatus realizes high sensitivity recording display and realizes recording display with short writing pulse application time. The photo-addressable type recording display apparatus is provided with a recording unit that displays an image, a light writing unit that writes an image in the recording unit by the pattern of light, and a control unit that controls the recording unit and the light writing unit. The recording unit is provided with a spatial light modulation element and a driving unit, and the spatial light modulation element has a memory liquid crystal display element layer and organic photoconductive switching element layer. The control unit determines the magnitude and the application time of a voltage that is applied on the spatial light modulation element by the driving unit so that the threshold voltage corresponds to the voltage waveform determined correspondingly to the comparative magnitude relation between the time constant D of the liquid crystal display element layer and the time constant S of the organic photoconductive switching element layer during non-irradiation with light and irradiation with light by the light writing unit, and supplies a trigger signal for driving waveform output to the driving unit.

17 Claims, 14 Drawing Sheets

FIG. 3

| | IRRADIATION WITH LIGHT | COMPARATIVE RELATION OF TIME CONSTANT | DISPLAY ELEMENT LAYER STATE | DISPLAY PATTERN |
|---|---|---|---|---|
| FIG. 2A | NO | D≪S | ON | NEGATIVE |
| FIG. 2B | YES | D≧S | OFF | |
| FIG. 2C | NO | D<S | OFF | POSITIVE |
| FIG. 2D | YES | D≧S | ON | |
| FIG. 2E | NO | D=S | ON | NEGATIVE |
| FIG. 2F | YES | D>S | OFF | |
| FIG. 2G | NO | D<S | OFF | POSITIVE |
| FIG. 2H | YES | D<S | ON | |
| FIG. 2I | NO | D>S | OFF | POSITIVE |
| FIG. 2J | YES | D>S | ON | |
| FIG. 2K | NO | D>S | ON | NEGATIVE |
| FIG. 2L | YES | D>S | OFF | |
| FIG. 2M | NO | D<S | ON | NEGATIVE |
| FIG. 2N | YES | D>S | OFF | |
| FIG. 2O | NO | D<S | OFF | POSITIVE |
| FIG. 2P | YES | D>S | ON | |
| FIG. 2Q | NO | D<S | ON | NEGATIVE |
| FIG. 2R | YES | D>S | OFF | |
| FIG. 2S | NO | D<S | OFF | POSITIVE |
| FIG. 2T | YES | D≧S | ON | |

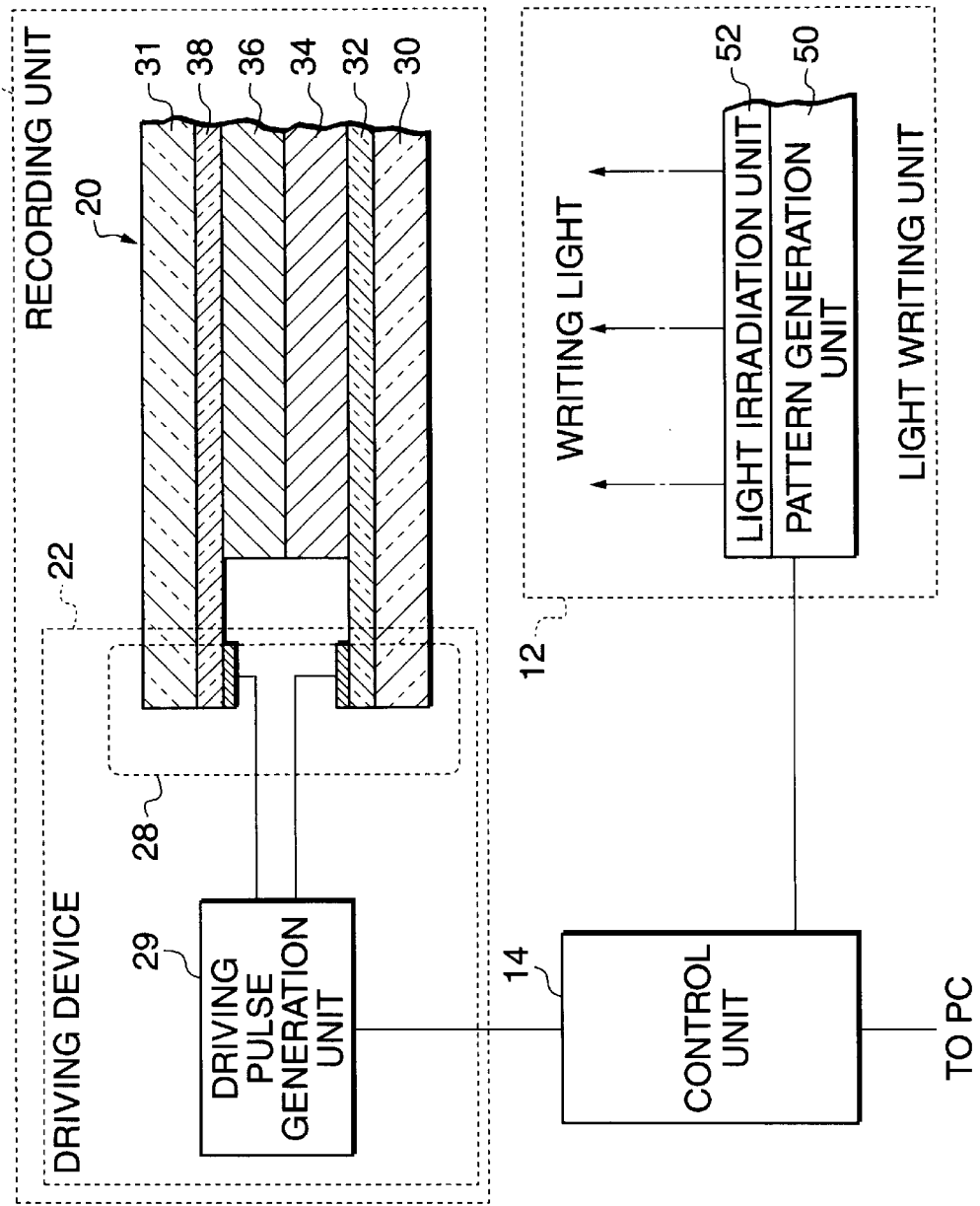

INCIDENT LIGHT

PHOTO-ADDRESSABLE TYPE RECORDING DISPLAY APPARATUS

BACKGROUND OF THE INVENTION

1. Field of the Invention

This invention relates to a photo-addressable type recording display apparatus, and more particularly relates to a photo-addressable type recording display apparatus provided with a light switching element and a display element combined together.

2. Description of the Related Art

Recently, a photo-addressable type spatial light modulation device provided with functional elements such as photoconductive light switching element and a display element that are combined together has been developed, and has been used practically as a light valve of a projector. Furthermore, it is tried to use it in the optical information processing field as described in "Liquid crystal spatial light modulator and information processing" EKISHO, Vol. 2, No. 1, 1998, pp. 3–18.

Furthermore, for example, as described in H. Yoshida, T. Takizawa, et al., "Reflective Display with Photoconductive Layer and a Bistable, Reflective Cholesteric Mixture" SID, 1996, APPLICATION DIGEST, pp. 59, a recording display medium provided with a display element formed of cholesteric liquid crystal and a light switching element formed of amorphous silicon and Elgraphy system that is an image input system formed of laminated memory liquid crystal and organic photosensitive material have been studied as a photo-addressable type recording display medium.

As the display material used for the display element of such photo-addressable type recording display medium, various liquid crystal material such as nematic liquid crystal, twist nematic liquid crystal, super twist liquid crystal, and smectic liquid crystal, surface-stabilized ferroelectric liquid crystal, polymer dispersion liquid crystal that is formed by polymer-dispersing the liquid crystal material as described hereinabove, and capsulated liquid crystal that is formed by capsulating the liquid crystal material as described hereinabove have been known.

A photo-addressable type recording display medium provided with a display element formed of memory display material is capable of holding the display state without electric power for holding the recording display. Therefore, because the display state is held even if the display medium is detached from a writing apparatus after the digital information has been recorded and displayed, it is possible to carry away the display medium that has been detached from the writing apparatus, and such display medium has been attract much attentions as an electronic paper medium.

For example, cholesteric liquid crystal, ferroelectric liquid crystal, polymer dispersion liquid crystal, and capsulated liquid crystal have been known as memory display material, and application of these display material to a recording display medium that is detachable from a power source has been studied.

Particularly, a filter used for color selection is unnecessary for cholesteric liquid crystal or cholesteric capsulated liquid crystal that is formed by capsulating cholesteric liquid crystal because of its selective reflectibility, and also color display is realized by use of an external single electrode, these display element material has attracted much attentions because of advantages described hereinabove.

On the other hand, amorphous silicon (referred to as a-Si:H hereinafter) that has been proposed as an electronic photographic photosensitive material and has been used practically and organic photosensitive material (referred to as OPC hereinafter) have been known as the element used for a light switching element of a photo-addressable type recording display medium. The photosensitive material such as Se and CdS is not used currently though these are usable for a light switching element, because these are severely harmful for the environment and human body.

a-Si:H has been used practically as photosensitive material for electronic photography and the high sensitivity and high hardness are characteristic of a-Si:H. However, a-Si:H is disadvantageous in that the manufacturing cost is high because a large scale facility is necessary for manufacturing because it is manufactured by chemical vapor deposition and the film depositing speed is as low as several $\mu$m/h. As the result, a-Si:H is replaced by OPC because of its low cost and high sensitivity.

A general schematic structure of a photo-addressable type recording display medium provided with such display element and light switching element is shown in FIG. 12. In FIG. 12, the photo-addressable type recording display medium 70 has a laminate structure in which a conductive substrate 60, a charge generation layer (CGL) 62 formed of OPC placed on the conductive substrate 60, and a charge transfer layer (CTL) 64 formed of OPC are laminated in the order from the bottom. The charge generation layer 62 functions as a light switching element layer and generates holes and electrons in the layer when it is irradiated with a light. The charge transfer layer 64 is formed of OPC that functions to transfer electrons, and functions to transfer holes or electrons generated in the charge generation layer 62 in one-way or in two-way fashion.

In the case that an image is to be formed by use of the recording display medium 70 having the structure as described hereinabove, at first ions are charged on the surface of the charge transfer layer 64 side, and the surface is irradiated with a light having the distribution corresponding to the image data. When the surface is irradiated with the light, holes and electrons are generated in quantity corresponding to the light quantity. The one of generated holes and electrons is attracted to the ions charged on the surface of the charge generation layer 62, moves toward the surface side of the charge generation layer 62, and offsets the charges of ions on the surface.

In other words, charges on the part irradiated with the light is extinguished and on the other hand charges on the part not irradiated with the light remains unchanged. Thereafter, when charged toner is supplied on the charge transfer layer 64 side surface, toner remains only on the part where the charge remains, and the toner image that remains on the charge transfer layer 64 side surface is transferred and fixed on a recording medium to thereby obtain an image.

Elgraphy system (referred to as Elgraphy hereinafter) that uses a display medium having the structure as described hereinabove as a recording display medium for an electrostatic image recording system is proposed in Japan Hardcopy, 1996, Fall Meeting, pp. 25.

The Elgraphy is an alternative to development system in photography, and has attracted much attention as a system used for reproducing an image that has been easily taken by a camera at high accuracy. In the Elgraphy, a recording display medium is formed by combining a liquid crystal layer formed of memory liquid crystal and an OPC layer together. The OPC layer, which is used as a light switching element, functions to apply a DC voltage on the recording display medium and to selectively irradiate the recording display medium with a light to thereby generate charges in the OPC layer. The OPC layer transfers the charges to the liquid crystal layer and applies an electric field on the liquid crystal layer to thereby orient liquid crystal molecules, and thus the storable image is displayed.

The Elgraphy is used exclusively for recording mainly and not used for rewriting, but it is possible to rewrite an image. In the case that an image is to be rewritten, the image is erased thermally as described in, for example, Japan Hardcopy, 1996, Fall Meeting, p25, and the recording processing described hereinabove is performed again.

However, the Elgraphy having the structure as described hereinabove is involved in problem in repetitive recording because the AC driving is not effective. In detail, because electron attractive material or electron donating material is used as the charge transportable material of the charge transport layer usually, only any one of electron or hole is transported through the charge transport layer. Therefore, a light switching element having such charge transport layer functions as a rectifier.

Therefore, it is difficult to apply the electric field of one polarity out of the electric fields of the positive and negative polarity, it is substantially equivalent to the application of DC bias on the liquid crystal. As the result, ions in the liquid crystal moves to the place near the electrode by means of action of the bias, the electric field thereby generated near the electrode prevents switching, and no switching causes the image sticking. That is a problem.

To prevent the problem of image sticking due to movement of ions in the liquid crystal, the positive and negative AC electric field is applied usually. Though some charge transportable material such as polyvinyl carbazole is served for bipolar transport, and such material is less sensitive and is not used practically.

The conventional recording principle of such photo-addressable type modulation element or photo-addressable type recording medium is described in, for example, "O plus E, 1997, No. 206, pp. 115–119", and described herein under.

In detail, in a photo-addressable type modulation element or display medium shown in FIG. 13A and FIG. 13B, a display element having a type of threshold value and a light switching element are connected in series and a voltage is applied on both ends. Because the respective capacity components of the display element 80 and the light switching element are approximately constant in respect to the light quantity, and the impedance can be controlled by means of resistance component.

The display is controlled by controlling voltage division ratio of impedance of the display element 80 and light switching element 82.

Particularly, in the case that the impedance of the light switching element layer is lowered, namely in the case that low resistance is used, "conductive state" electrical equivalent circuit is used as described in SID 96, APPLICATIONS DIGEST, pp. 59–60.

The term "conductive state" described herein means the state in which the resistance component of the light switching element layer is extremely reduced to a low impedance during irradiation with light, or means the state in which the resistance is reduced to an impedance so low as regarded as conductor as an electric equivalent circuit. In the numerical expression, "conductive state" means the state that the resistance component of the light switching element layer is reduced to approximately $\frac{1}{100}$ resistance component of the display element layer.

In this state, the effect of the capacitance component is very small and limited. Thereby, the division voltage becomes high, and as the result the voltage exceeds the threshold voltage of the display element layer and the display is turned on. Because of such structure, it is required for the light switching element to have the resistance component that is reduced to as small value as possible when irradiation is performed.

On the other hand, when the display is to be turned off, high impedance is required, and a light switching element having the resistance component value that becomes low when irradiation with light is performed and becomes high when irradiation with light is not performed is necessary as described in Japanese Published Unexamined Patent Application No. Hei 10-20328.

For example, a display medium in which a-Si:H is used for a light switching element and ferroelectric liquid crystal is used for a display element has been known as described in APPLIED OPTICS pp. 6859–6868.

The resistivity of the resistance component of a-Si:H falls from $1.0 \times 10^{11}$ Ωcm to $1.0 \times 10^{8}$ Ωcm with light radiation of 1 mW/cm$^2$. On the other hand, because the resistivity of the display element layer is $>1.0 \times 10^{10}$ Ωcm, the impedance of the light switching element layer becomes conductive by irradiation with light.

In other words, because the light switching element becomes conductive when irradiation with light is performed, the voltage applied to the display element layer becomes high, and as the result the display is turned on. On the other hand, the impedance of the light switch becomes high during non-irradiation with light, and the voltage applied to the display element becomes low to an amplitude lower than the threshold value of the display element, and as the result the display is turned off.

Therefore, a display medium is designed so that the light switching element becomes conductive and a voltage higher than the threshold value is applied to the display element during irradiation with light and the impedance of the light switching element layer becomes high and a voltage lower than the threshold value is applied to the display element during non-irradiation with light. Thereby, ON/OFF switching of the display unit is controlled. The display unit is switched between ON and OFF by operating the irradiation between ON and OFF selectively.

A photo-addressable type recording display medium in which cholesteric liquid crystal is used for the display element and a-Si:H is used for the light switching element is proposed as a detachable recording display medium provided with a display element formed of the above-mentioned memory display material in, for example, SID 96, APPLICATIONS DIGEST pp. 59–62.

FIG. 14 shows the reflectance characteristic of the photo-addressable type recording display medium to the externally applied voltage. In the case of this photo-addressable type recording display medium, the light switching element layer becomes conductive and the division voltage becomes small, and the threshold value during application of voltage becomes low (namely low threshold value Va) by irradiation with light. On the other hand, the resistance becomes high and the impedance becomes high, and the threshold value becomes high (namely high threshold value Vb) during non-irradiation with light.

Therefore, as shown in FIG. 14, the applied voltage is set to be in the relation Va<Vc<Vb, and the irradiation with light is selectively performed for image recording. The division voltage due to fluctuation of the impedance is designed so as to be equal to or higher than the threshold value when the display is ON, on the other hand so as to be lower than the threshold value when the display is OFF.

However, in the case of such recording, because it takes a some long time for the division voltage to approach the voltage division ratio corresponding to the impedance, it is required that the recording pulse is continuously applied until the division voltage approaches the voltage division ratio corresponding to the impedance.

Furthermore, the much quantity of light is needed to render the impedance of the light switching element layer low for light writing, and this is also a problem.

Heretofore, the irradiation with light is performed as much as possible as long as the condition is allowable when the irradiation renders the resistance component low. Particularly, in the case that $Bi_{12}SiO_{20}$ element or organic photosensitive element is used for the light switching element, the resistance component during non-irradiation with light is very large, and much light quantity is inevitably required to render the resistance of the light switching element layer conductive. For example, the resistance components of organic photosensitive material is equal to or larger than 100 M$\Omega$/cm$^2$ usually, or equal to or larger than 1 G$\Omega$/cm$^2$ in some cases. The irradiation with light of 1 mW/cm$^2$ or more is needed to render the resistance of the light switching element layer conductive 1 G$\Omega$/cm$^2$ or less.

Furthermore, the recording display medium of this type is involved in another problem that the pulse application time is long. In detail, because the time constant of the light switching element or display element layer during non-irradiation with light is long, it is required that a voltage should be applied continuously until the applied voltage is stabilized.

For example, in the case of a photo-addressable type modulation element provided with the above-mentioned cholesteric liquid display element and a-Si:H light switching element that are combined together, because the resistance is approximately 10 M$\Omega$/cm$^2$ and the capacitance is approximately 4 nF/cm$^2$, the time constant is approximately 40 ms resultantly, and approximately 160 ms is required to reach the resistance component ratio of the impedance.

On the other hand, in the case that organic photosensitive material is used for the light switching element, the resistance is approximately 1 G$\Omega$/cm$^2$ and the capacitance is approximately 1 nF/cm$^2$ usually under dark resistance, namely during non-irradiation with light. In this case, the time constant is inevitably as long as 1 second. In addition to the above-mentioned problem, the recording display medium is involved in another problem in the case that liquid crystal material is used for the display element. In detail, ions in the liquid crystal are removed sometimes to improve performance of the display, at that time the resistance component becomes a value equal to or larger than several tens M$\Omega$/cm$^2$ or and the capacitance component becomes a value in a range from 0.1 nF/cm$^2$ to several tens nF/cm$^2$ because of the structure described hereinabove, and the time constant becomes resultantly as long as several hundreds m seconds to 1 second inevitably.

Furthermore, the conventional recording method is involved in another problem that only a positive image is obtained for a writing image. The positive recording means a recording method that the display is turned on brightly during irradiation with light and the display is turned off darkly during non-irradiation with light, and on the other hand the negative recording means a recording method that the display is turned off darkly during non-irradiation with light and the display is turned on brightly during non-irradiation with light. When the display is turned on, the state is in high reflectance in the case of the reflection type and the state is in high light transmittance in the case of the transmission type. When the display is turned off, the state is in low reflectance in the case of the reflection type and the state is in low transmittance in the case of the transmission type.

SUMMARY OF THE INVENTION

The present invention has been made in view of the above circumstances and provides a photo-addressable type recording display apparatus that is capable of high sensitivity recording and displaying with a short writing pulse application time. Furthermore, the present invention provides a photo-addressable type recording display apparatus that is capable of switching between positive display and negative display easily.

The photo-addressable type recording display apparatus according to the present invention includes: a photo-addressable type recording display medium provided with a memory display element layer having a predetermined impedance and a light switching element layer having an impedance that is variable depending on irradiation with light laminated on the display element layer and electrically connected in series to the display element layer; a pattern light irradiation source that irradiates the photo-addressable type recording display medium with a pattern light that has been converted corresponding to image information; a pulse voltage application part that applies a predetermined pulse voltage to the photo-addressable type recording display medium; and a driving control part that controls the pulse voltage applied by the pulse voltage application part in accordance with a result of comparison between the predetermined impedance of the display element layer and the impedance of the light switching element layer varied depending on the quantity of light from the pattern light irradiation source for controlling a pulse waveform and a voltage amplitude of the voltage applied to the display element layer, thereby controlling the display state of the photo-addressable type recording display medium.

BRIEF DESCRIPTION OF THE DRAWINGS

Preferred embodiments of the present invention will be described in detail based on the followings, wherein:

FIG. 3 is a table for showing during irradiation with light/during non-irradiation with light, the comparative magnitude relation between the time constant D of the display element layer and the time constant S of the organic photoconductive switching element layer, the state of the display element layer, and the display pattern corresponding to the voltage waveform shown in FIG. 2A to FIG. 2T, FIG. 4 is an explanatory diagram illustrating the schematic structure of a photo-addressable type recording display apparatus in accordance with an embodiment of the present invention.

DETAILED DESCRIPTION OF THE PREFERRED EMBODIMENTS

Figure 1A:
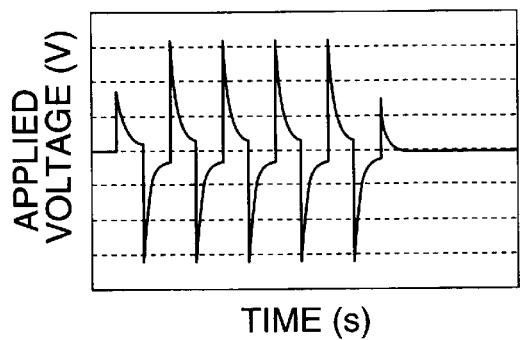
FIG. 1A to FIG. 1E are graphs illustrating waveforms for describing the waveform change of the voltage waveform applied to the display element layer due to impedance mismatching between the display element layer and the organic photoconductive switching element layer.

In the present invention, a driving control unit controls the pulse waveform and the voltage amplitude of a voltage applied to the display element layer depending on the comparative relation between the impedance of the display element layer and the impedance of the light switching element layer that changes depending on the light quantity for irradiation incident from the light irradiation unit to thereby control the display state (namely ON/OFF of the display) of the photo-addressable type recording display medium.

As the method for controlling the pulse waveform of the voltage applied to the display element layer, for example, a pulse waveform forming method in which the arbitrary waveform is formed electrically for controlling or a method in which the impedance of the display element layer is matched with the impedance of the light switching element layer (impedance matching is performed) may be applied. Preferably, the method in which the impedance matching is performed may be used.

Furthermore, at least one of the time constant of the display element layer and the time constant of the light switching element layer is controlled to thereby change the comparative magnitude relation between the impedance of the display element layer and the impedance of the light switching element layer for performing impedance matching. The time constant can be controlled by changing the resistance component or changing the capacitance component.

For example, a laser light is incident on and absorbed in a light switching element to thereby cause phase change of the light switching element, the phase change causes the temperature rising, and the temperature rising causes the resistance component change of the light switching element layer or causes the capacitance component change. As the result, the time constant can be controlled depending on the irradiation quantity and time of the laser light.

In another way, the light switching element layer formed of photoconductive material is used, the driving control unit controls the quantity of light for irradiation incident from the light irradiation unit, the charge quantity generated in the light switching element layer correspondingly to the quantity of light is controlled to thereby change the resistance component of the switching element layer, and as the result the time constant can be controlled.

The structure in which the light switching element layer is formed of photoconductive material and the time constant is controlled is particularly preferable because the recording time and repeatability are reliable.

As described hereinabove, the display control is performed by impedance matching in which mismatching between the impedance of the display element layer and the impedance of the light switching element layer based on irradiation with light is adjusted so as to be matched.

Herein, the mismatching of impedance will be described. Generally, because the capacitance does not change regardless of irradiation with light, the resistance component is changed for waveform control by impedance matching.

In the case that a pulse is applied when the display element layer and the light switching element layer are connected each other in series, the voltage waveform applied to the display element layer is not rectangular though a rectangular pulse is applied. The reason is that each of the display element layer and the light switching layer can be almost regarded as a circuit having the resistance component and the capacitance component that are connected in parallel, and in the case that such circuits are connected in series, the capacitance division that is dependent of the capacitance component is predominant at first, but the resistance division that is dependent of the resistance component becomes predominant with elapse of time.

FIG. 1A to FIG. 1E show the conceptual diagram of the voltage applied to the display element layer corresponding to the voltage applied to the light switching element layer in the case that the display element layer and the light switching element layer are connected each other in series. FIG. 1A to FIG. 1E show diagrams of the voltage waveform that is applied to the display element layer obtained when 5 rectangular pulses are applied, respectively. Examples in which the capacitance is almost equal are shown herein.

In the case that the impedance S of the light switching element layer is significantly larger than the impedance D of the display element layer (D<<S), the voltage waveform applied to the display element layer is similar to the differential waveform as shown in FIG. 1A. The reason is usually that the light switching element layer functions as a capacitor because the resistance component becomes very large. An overshoot is seen after the final pulse.

Figure 1D:
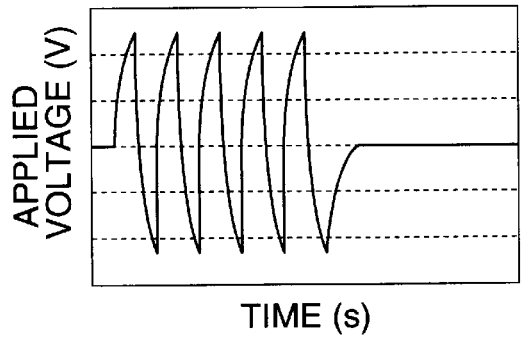
Figure 1B:
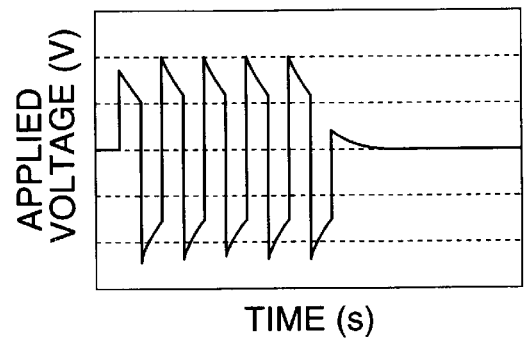

In the case that the impedance D of the display element layer is larger than the impedance S of the light switching element layer (D<S), the voltage waveform is shown in FIG. 1B. At that time, usually the resistance component is several times to several tens times.

In the case that the resistance component of the light switching element layer is lower than those in the above-mentioned cases and the impedance D of the display element layer is equal to the impedance S of the light switching element layer (D=S), the voltage waveform is shown in FIG. IC in which the rectangular pulse is applied as it is. Of course, even though the impedance of the light switching element layer is not exactly equal to the impedance of the display element layer, that is, in the case that the resistance component is approximately ½ to 2 times usually, the voltage waveform that is almost equal to the voltage waveform that would be obtained when both impedances are equal can be obtained.

Furthermore, in the case that the resistance component of the light switching element layer is lower and the impedance S of the light switching element layer is smaller than the impedance D of the display element layer (D>S), the voltage waveform is shown in FIG. 1D in which the voltage waveform is smoothed. Such voltage waveform is obtained when the resistance value is several tenth to several hundredth.

Figure 1E:
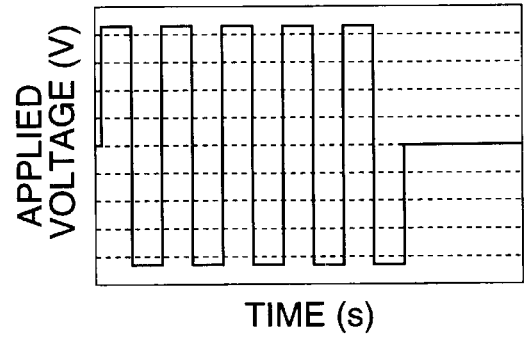
Figure 1C:
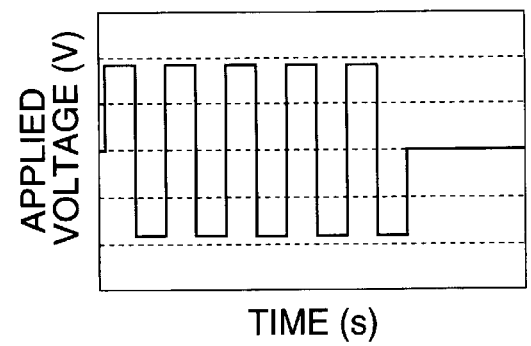

Furthermore, in the case that the resistance component of the light switching element layer is further lower and the impedance S of the light switching element layer is significantly smaller than the impedance D of the display element layer (D>>S), and the light switching element becomes equivalent to conductor. Therefore, the voltage waveform applied to the display element layer becomes equal to the applied voltage pulse as shown in FIG. 1E. As a matter of course, in the case that a functional film is provided, the voltage drops correspondingly, but the impedance of the functional film is smaller than those of the display medium and the light switching element layer and the effect of the functional film is usually not so significant. Furthermore, even though the functional film is provided, the impedance change corresponding to irradiation with light is not significant, and the effect on the waveform applied to the display element is not significant.

Figure 2A:
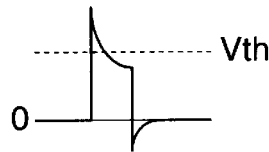
FIG. 2A to FIG. 2T are explanatory diagrams for describing the voltage waveform applied to the display element layer and the threshold voltage.

Next, the recording display control of the photo-addressable type recording display medium in which the voltage waveform as described hereinabove is used will be described. FIG. 2A to FIG. 2T show schematic diagrams of the voltage waveform applied to the display element layer of the photo-addressable type recording display medium for the case of irradiation with light and for the case of non-irradiation with light. In this case, the applied voltage is actually AC voltage for driving, and the plural waveforms appear because positive/negative pulse is applied. Herein, only the final waveform is shown for the purpose of description.

FIG. 3 is a table listing irradiation with light/non-irradiation with light, the comparative magnitude relation between the time constant D of the display element layer and the time constant S of the light switching element layer, ON/OFF state of the display element layer, and the display pattern corresponding to the voltage waveform shown in FIG. 2.

At first, the first case of the photo-addressable type recording display medium in which the time constant S of the light switching element layer is extremely larger than the time constant D of the display element layer during non-irradiation with light (S>>D) and the time constant S of the light switching element layer during irradiation with light is approximately equal to the time constant of the display element layer (S≈D) or is smaller than the time constant D of the display element layer (S<D) in the photo-addressable type recording display medium will be described. In this case, the driving control unit controls the voltage applied to the photo-addressable type recording display medium so that, during non-irradiation with light, the applied voltage equal to or higher than the threshold value is applied to the display element layer continuously for a duration that is sufficiently high to change the phase of the display element layer, and on the other hand the driving control unit controls the voltage applied to the photo-addressable type recording display medium so that, during irradiation with light, the voltage having the voltage amplitude and voltage application time that are not sufficient for the display element layer to reach the threshold value is applied to the display element layer. Otherwise, the driving control unit controls the voltage applied to the photo-addressable type recording display medium so that the voltage of the display element layer is substantially equal to or lower than the threshold voltage during irradiation with light due to waveform transformation.

Figure 2B:
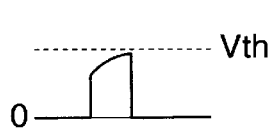

In other words, in the first case, the voltage waveform applied to the display element layer during non-irradiation with light is similar to the differential waveform as shown in FIG. 2A, the voltage waveform applied to the display element layer during irradiation with light is rectangular pulse waveform or rectangular pulse that is slightly deformed with rising to the right as shown in FIG. 2B.

Therefore, in the case of the first case, the driving control unit applies the voltage so that the threshold value is equalized to $V_{th}$ shown in FIG. 2A and FIG. 2B to thereby turn on the display element layer during non-irradiation with light and turns off the display element layer during irradiation with light, and thus the negative recording is performed. In other words, the applied voltage is set correspondingly to the waveform profile and threshold value as shown in FIG. 2A and FIG. 2B to thereby perform the negative recording. As the result, by controlling as described hereinabove, the high sensitivity recording apparatus having a wide margin can be obtained.

At that time, the driving control unit applies the pulse for a duration that is sufficiently long to change the phase of the display element layer. The duration that is sufficiently long to change the phase is, for example, approximately 1 ms to 10 ms in the case that cholesteric liquid crystal is used for the display element layer, and equal to or shorter than 1 ms in the case that ferroelectric liquid crystal is used.

Furthermore, in the case that the voltage profile during the time from dropping of the applied voltage to an amplitude equal to or lower than the threshold value to the turning-off of the display is selected, it is required to select the pulse application time so that the display is not turned off. The time ranges usually from 1 ms to 100 ms.

The positive recording can be also realized. For performing the positive recording, the driving control unit controls so that a voltage corresponding to the threshold value $V_{th}$ shown in FIG. 2B is applied for a duration of pulse application time that is sufficiently long to turn off the display in the voltage profile continuing from the time when the applied voltage drops to an amplitude equal to or lower than the threshold value to the time when the display is turned off.

In this case, if the time constant S of the light switching element layer is small, the voltage that is higher than the threshold value may be applied for a duration that is sufficiently long to change the phase. If the time constant D of the display element layer is smaller than the time constant S of the light switching element layer, because the waveform transformation occurs during display-off, the applied voltage is controlled so that the effect on the display-on is reduced.

The effect of the waveform transformation is remarkable if the duration from the time when the voltage drops to an amplitude equal to or lower than the threshold value to the time when the voltage drops to an amplitude approximately equal to or lower than 4 V/μm is equal to or longer than 10 ms, for example, the reflectance is reduced.

In this case, a positive image on which the background is bright and the image portion is dark can be displayed without forming a reversed light pattern that is formed by reversing the image data.

Furthermore, in the case that the display is turned off by controlling so that the voltage of the display element layer is reduced to an amplitude equal to or lower than the threshold value due to the waveform transformation to turn off the display, the applied voltage is set so that the threshold value is equalized to $V_{th}$ shown in FIG. 2A and FIG. 2B to thereby turn off the display during irradiation with light, and thus the negative recording in which the display is OFF during irradiation with light is possible.

Such situation can be realized by setting the duration, that continues from the time when the voltage drops to an amplitude equal to or lower than the threshold value to the time when the voltage drops to an amplitude approximately equal to or lower than 4 V/μm, to a time of 10 ms or longer in the case of cholesteric liquid crystal. This setting can be achieved by setting the voltage to a desired value.

Next, the case of the photo-addressable type recording display medium in which the time constant S of the light switching element layer is larger than the time constant D of the display element layer (S>D) during non-irradiation with light, and the time constant S of the light switching element layer is almost equal to the time constant D of the display element layer (S≈D) or is smaller than the time constant D of the display element layer (S<D) during irradiation with light in the photo-addressable type recording display medium is described herein under. The driving control unit controls the voltage applied to the photo-addressable type recording display medium so that a voltage that is higher than the threshold voltage and has a magnitude sufficient to change the phase is applied to the display element layer. Furthermore, the driving control unit controls the voltage applied to the photo-addressable type recording display medium so that a voltage that is equal to or higher than the threshold value is applied for a duration that is sufficiently long to change the phase of the display element layer during irradiation with light, and controls the voltage applied to the photo-addressable type recording display medium so that a voltage of a magnitude that is sufficient to turn off the display element layer due to the voltage drop that occurs in the duration from the time when the voltage drops to an amplitude equal to or lower than the threshold value to the time when the voltage is turned off for the voltage application time during irradiation with light.

Figure 2C:
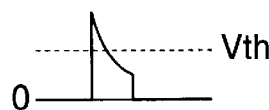
Figure 2D:
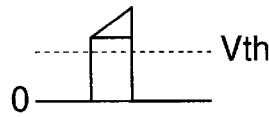

In the second case, the voltage waveform applied to the display element layer during non-irradiation with light is shown in FIG. 2C, in which the waveform shown in FIG. 2A is deformed. On the other hand, the voltage waveform applied to the display element layer during irradiation with light is shown in FIG. 2D, in which it is rectangular pulse or rectangular pulse that is deformed slightly upward to the right.

In the second case, for both cases of irradiation with light and non-irradiation with light, the driving control unit applies a voltage that is higher than the threshold voltage and is sufficient to change the phase. However, during irradiation with light, the driving control unit controls the voltage so that a voltage having an amplitude equal to or higher than the threshold value is applied for a duration that is sufficiently long to change the phase, and, during non-irradiation with light, controls the voltage to have an amplitude and duration of application that is sufficient to turn off the display due to the voltage drop from an amplitude equal to or lower than the threshold value to the voltage being turned off. As the result, it is possible to perform the positive recording in which the display of the display element layer is turned on during irradiation with light and the display of the display element layer is turned off during non-irradiation with light.

In this case, cholesteric liquid crystal and capsulated cholesteric liquid crystal, in which display is controllable due to sharpness that occurs when the voltage is turned off, are particularly preferable as the display element layer. Organic photosensitive material is used preferably for the light switching layer because the impedance during non-irradiation with light is high and effective.

Furthermore, the third case of the photo-addressable type recording display medium in which the time constant S of the light switching element layer is approximately equal to the time constant of the display element layer (S≈D) during non-irradiation with light and the time constant S of the light switching element layer is smaller than the time constant D of the display element layer (S<D) during irradiation with light is described herein under. The driving control unit controls the voltage applied to the photo-addressable type recording display medium so that an applied voltage having an amplitude equal to or higher than the threshold value is applied to the display element layer for a duration that is sufficiently long to change the phase of the display element layer during non-irradiation with light, and controls the voltage applied to the photo-addressable type recording display medium so that the voltage of the display element layer drops to an amplitude effectively equal to or lower than the threshold value due to the waveform transformation during irradiation with light. The term "an amplitude effectively equal to or lower than the threshold value" means the state that the effect of high applied voltage equal to or higher than the threshold value disappears because the voltage drop profile is not sharp, and as the result the display performance becomes poor and the off state that is equivalent to the applied voltage equal to or lower than the threshold voltage results.

Figure 2E:
Figure 2F:
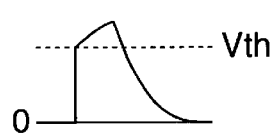

In the third case, the voltage waveform to be applied is rectangular pulse as shown in FIG. 2E during non-irradiation with light, and the voltage waveform is shown in FIG. 2F during irradiation with light.

Therefore in the third case, the driving control unit applies a voltage equal to or higher than the threshold value for a duration that is sufficiently long to change the phase during non-irradiation with light to thereby turn on the display, and sets the threshold value so that the display is turned off during irradiation with light due to the waveform transformation. Thus, the negative recording is performed.

Furthermore, in the third case, the driving control means controls the voltage applied to the photo-addressable type recording display medium so that a voltage equal to or higher than the threshold voltage is applied to the display element layer during non-irradiation with light, and controls the voltage applied to the photo-addressable type recording display medium so that an applied voltage equal to or higher than the threshold value is applied to the display element layer for a duration that is sufficiently long to change the phase of the display element layer during irradiation with light. Thus, the positive recording is also performed.

The fourth case of the photo-addressable type recording display medium in which the time constant D of the display element layer is larger than the time constant S of the light switching element layer (S>D) both during non-irradiation with light and during irradiation with light is described herein under. The driving control unit controls the voltage applied to the photo-addressable type recording medium so that an applied voltage equal to or higher than the threshold value is applied to the display element layer for a duration that is sufficiently long to change the phase of the display element layer during irradiation with light. Furthermore, the driving control unit controls the voltage applied to the light writing time recording display medium so that a voltage is applied for a duration that is too short to change the phase of the display element layer during non-irradiation with light.

Figure 2G:
Figure 2H:
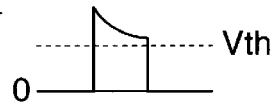

In this case, the voltage waveform applied during non-irradiation with light is shown in FIG. 2G, and the waveform applied during irradiation with light is shown in FIG. 2H. As the result, the positive recording is possible, in which a voltage equal to or higher than the threshold value is applied for a duration that is sufficiently long to change the phase during irradiation with light to thereby turn on the display and the display is turned off during non-irradiation with light due to the waveform transformation.

Otherwise, in the fourth case, the driving control unit controls the voltage amplitude and application time of the voltage applied to the photo-addressable type recording display medium so that the display of the display element layer is turned off due to the voltage drop that occurs from the time when the voltage applied to the display element layer drops to an amplitude equal to or lower than the threshold value to the time when the voltage is turned off during non-irradiation with light, and controls the voltage applied to the photo-addressable type recording display medium so that a voltage equal to or higher than the threshold value is applied to the display element layer for a duration that is sufficiently long to change the phase of the display element layer during irradiation with light.

The fifth case of the photo-addressable type recording display medium in which the time constant S of the light switching element layer is smaller than the time constant D of the display element layer (S<D) both during irradiation with light and also during non-irradiation with light is described herein under. The driving control unit controls the voltage applied to the photo-addressable type recording display medium so that application time is sufficiently shorter than the time that is required to change the phase of the display element layer or a voltage that is not equal to or not higher than the threshold value that is required to change the phase of the display element layer is applied (that is, a voltage lower than the threshold value is applied) during non-irradiation with light, and controls the voltage applied to the photo-addressable type recording display medium so that a voltage equal to or higher than the threshold voltage is applied to the display element layer during irradiation with light. In this case, the applied voltage is controlled so that the effect of the waveform transformation is reduced.

Figure 2I:
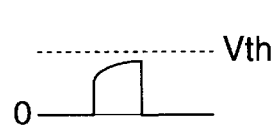
Figure 2J:
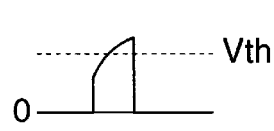

In this case, the voltage waveform applied during non-irradiation with light is shown in FIG. 2I, and the voltage waveform applied during irradiation with light is shown in FIG. 2J. As the result, in the fifth case, the positive recording is possible, in which the display is turned off during non-irradiation with light and the display is turned on during irradiation with light by setting the applied voltage so that the threshold value is $V_{th}$ shown in FIG. 2I and FIG. 2J respectively.

Furthermore, in the fifth case, the driving control unit controls the voltage applied to the photo-addressable type recording display medium so that a voltage equal to or higher than the threshold value is applied to the display element layer during irradiation with light and also during non-irradiation with light, and controls the voltage so that the display element layer is maintained effectively equal to or lower than the threshold voltage due to the waveform transformation during irradiation with light.

Figure 2K:
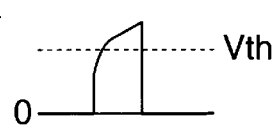
Figure 2L:
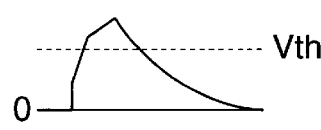

In this case, the voltage waveform applied during non-irradiation with light is shown in FIG. 2K and the voltage waveform applied during irradiation with light is shown in FIG. 2L. As the result, in the fifth case, the negative recording is possible in which the display is turned off during irradiation with light and the display is turned on during non-irradiation with light by setting the applied voltage so that the threshold value is $V_{th}$ shown in FIG. 2K and FIG. 2L respectively.

Next, the sixth case of the photo-addressable type recording display medium in which the time constant S of the light switching element layer is larger than the time constant of the display element layer (S>D) during non-irradiation with light and the time constant S of the light switching element layer is smaller than the time constant D of the display element layer (S<D) during irradiation with light will be described herein under. The driving control unit controls the voltage applied to the photo-addressable type recording display medium so that a voltage equal to or higher than the threshold value is applied for a duration that is sufficiently long to change the phase of the display element layer during non-irradiation with light and also during irradiation with light, and controls the voltage so that the display element layer is maintained effectively equal to or lower than the threshold value due to the waveform transformation after the voltage drops to an amplitude equal to or lower than the threshold value during irradiation with light.

Figure 2M:
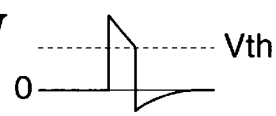
Figure 2N:
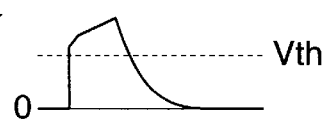
Figure 2O:
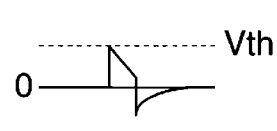

In this case, the voltage waveform applied during non-irradiation with light is shown in FIG. 2M, and the voltage waveform applied during irradiation with light is shown in FIG. 2N. As the result, the negative recording is possible, in which the display is turned on during non-irradiation with light and the display is turned off during irradiation with light by setting the applied voltage so that the threshold value is $V_{th}$ shown in FIG. 2M and FIG. 2N. At that time, because the display-on state is adversely affected if the duration while the voltage is being equal to or lower than the threshold value during irradiation with light is too long, the duration while the voltage is being equal to or lower than the threshold value is set so that the adverse effect on the display-on state is reduced.

As the result, the driving control unit applies the voltage so that the threshold value is $V_{th}$ shown in FIG. 2M and FIG. 2N, and the negative recording in which the display of the display element layer is tuned on during non-irradiation with light and the display of the display element layer is turned off due to the waveform transformation after the voltage is turned off during irradiation with light is performed.

In this case, the display element that is controllable of the reflectance based on the sharp characteristic that occurs when the voltage is turned off, for example, cholesteric liquid crystal is effective. It is preferable that the impedance matching is controlled so that the duration from the time when the voltage drops to an amplitude equal to or lower than the threshold value to the time when the voltage is turned off is approximately equal to or longer than, for example, 10 ms.

Furthermore, in the sixth case, the driving control unit controls the voltage applied to the photo-addressable type recording display medium so that a voltage equal to or higher than the threshold voltage is applied for a duration shorter than the time that is required to change the phase or a voltage lower than the threshold value is applied during non-irradiation with light, and controls the voltage applied to the photo-addressable type recording display medium so that a voltage equal to or higher than the threshold value that is required to change the phase of the display element layer is applied during irradiation with light. Thereby, the positive recording is possible, in which the display element layer is turned off during non-irradiation with light and the display of the display element layer is turned on based on the applied voltage equal to or higher than the threshold value during irradiation with light.

Figure 2P:
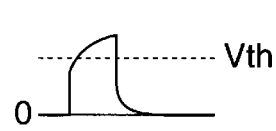

In this case, the voltage waveform applied to the display element layer during non-irradiation with light is shown in FIG. 20, and the voltage waveform applied to the display element layer during irradiation with light is shown in FIG. 2P. Because the waveform transformation occurs in off-characteristic during irradiation with light in the case of this structure described hereinabove in which the threshold value is $V_{th}$ shown in FIG. 20 and FIG. 2P, it is preferable that the applied voltage is set so that the adverse effect on the display-on is reduced.

The seventh case of the photo-addressable type recording display medium in which the time constant S of the light switching element layer is larger than the time constant D of the display element layer (S<D) during non-irradiation with light and the time constant of S of the light switching element layer is smaller than the time constant of the display element layer (S<D) during irradiation with light will be described herein under. The driving control unit controls the voltage applied to the photo-addressable type recording display medium so that a voltage equal to or higher than the threshold value is applied to the display element layer for a duration that is sufficiently long to change the phase due to overshooting that occurs when the voltage is turned off during non-irradiation with light, and controls the voltage applied to the photo-addressable type recording display medium so that the applied voltage of overshooting that occurs when the voltage is turned off is lower than the voltage amplitude that is required to change the phase of the display element layer or so that the voltage is applied for a duration shorter than the time that is required to change the phase of the display element layer during irradiation with light.

Figure 2Q:
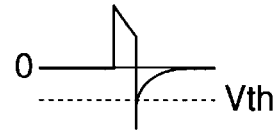
Figure 2R:
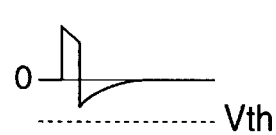

In the seventh case, the voltage waveform applied to the display element layer during non-irradiation with light is shown in FIG. 2Q, and the voltage waveform applied to the display element layer during irradiation with light is shown in FIG. 2R.

As the result, in the seventh case, the driving control unit controls the applied voltage so that the threshold value is $V_{th}$ shown in FIG. 2Q and FIG. R. Thereby, the negative recording can be performed, in which the display of the display element layer is turned on during non-irradiation with light and the display of the display element layer is turned off during irradiation with light because the voltage does not reach to the threshold value.

At that time, because the waveform transformation occurs during irradiation with light, it is preferable to set the applied voltage so that the adverse effect on the display-on is reduced. In the case that cholesteric liquid crystal is used for the display element layer, the duration from the time when the voltage drops to an amplitude equal to or lower than the threshold value to the time when the voltage is turned off is set to an amplitude equal to or shorter than 10 ms to thereby reduce the adverse effect of the waveform transformation.

Furthermore, the eighth case of the photo-addressable type recording display medium provided with a display element layer having the first threshold value $V_{th-1}$ at which the display is turned off and the second threshold value $V_{th-2}$ at which the display is turned on in which the time constant S of the light switching element layer is approximately equal to the time constant D of the display element layer (S≈D) or smaller than the time constant D of the display element layer (S<D) during irradiation with light will be described herein under. The driving control unit controls the voltage applied to the photo-addressable type recording display medium so that an applied voltage having an amplitude equal to or higher than the first threshold value $V_{th-1}$ and equal to or lower than the second threshold value $V_{th-2}$ due to the overshooting that occurs when the display is turned off is applied to the display element layer during non-irradiation with light, and controls the voltage applied to the photo-addressable type recording display medium so that a voltage equal to or higher than the second threshold value $V_{th-2}$ is applied to the display element layer during irradiation with light. In this case, because the overshooting or waveform transformation is not problematic as long as the overshooting or waveform transformation does not affect adversely on the display characteristic, the time constant S of the light switching element layer may be slightly larger than the time constant D of the display element layer during irradiation with light.

Figure 2S:
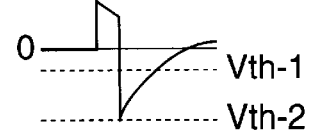
Figure 2T:
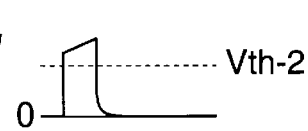

In the eighth case, the voltage waveform applied to the display element layer during non-irradiation with light is shown in FIG. 2S, and the voltage waveform applied to the display element layer during irradiation with light is shown in FIG. 2T.

Therefore, in the eighth case, when the driving control unit applies the voltage so that the threshold value is equalized to the second threshold value $V_{th-2}$, the display of the display element layer is turned on during irradiation with light, and the display of the display element layer is turned off during non-irradiation with light because the overshooting is equal to or higher than the first threshold value $V_{th-1}$ and lower than the second threshold value $V_{th-2}$.

Because the waveform transformation occurs during irradiation with light while the display of the display element layer is being turned on, the applied voltage is controlled so that the adverse effect of the waveform transformation on the display-on is reduced. Furthermore, the driving control unit controls the voltage to be applied and the duration so that the overshooting does not exceed the first threshold value $V_{th-1}$ and the display of the display element layer is not turned off during irradiation with light while the display of the display element layer is being turned on. For example, in the case that cholesteric liquid crystal is used for the display element layer, the first threshold value $V_{th-1}$ for display-off is approximately 4 V/μm, and the second threshold value $V_{th-2}$ for display-on is approximately 12 V/μm.

Though the case of one threshold voltage of the display element layer for reflectance or the case of two threshold values is described hereinbefore in the description of the photo-addressable type recording display apparatus, the number of threshold value of the display element layer is by no means limited to one in the photo-addressable type recording display apparatus described hereinabove having one threshold value, but a display element layer having one or more threshold values may be applied. Similarly, the number of threshold value is by no means limited to two in the photo-addressable type recording display apparatus described hereinabove having two threshold values, but a display element layer having two or more threshold values may be applied.

The display element layer having one threshold voltage for reflectance means a display element layer containing a display medium having only one threshold value Va in which the reflectance is different depending on the applied voltage between Va or lower and Va or higher. For example, smectic liquid crystal, ferroelectric liquid crystal, nematic liquid crystal, inorganic electrochromic element, electrophoretic element, electric field control type particle element, capsulated liquid crystals that are prepared by capsulating these materials, polymer network stabilized liquid crystal elements that are prepared by dispersing these materials in matrix polymer may be used as the display medium.

For example, in the case of capsulated nematic liquid crystal element, the reflectance is low under an applied voltage equal to or lower than the threshold voltage, and is high under an applied voltage equal to or higher than the threshold voltage.

The display element layer having two threshold voltages for reflection means a display element layer containing a display medium having two threshold values $V_{th-1}$ and $V_{th-2}$ ($V_{th-1} < V_{th-2}$), in which the reflectance remains unchanged under the applied voltage equal to or lower than $V_{th-1}$, the reflectance is low under the applied voltage between $V_{th-1}$ and $V_{th-2}$, and the reflectance is high under the applied voltage equal to or higher than $V_{th-2}$, or the reflectance is high under the applied voltage between $V_{th-1}$ and $V_{th-2}$, and the reflectance is low under the applied voltage equal to or higher than $V_{th-2}$. In other words, as described herein, the display element layer having two threshold voltages for reflection means a display element layer containing a display medium in which the reflectance of the display medium changes differently at the two threshold values $V_{th-1}$ and $V_{th-2}$.

The external voltage V that is equal to or higher than the threshold value $V_{th}$ is described herein under. It is assumed that layers other than the display element layer and the light switching element layer can be ignored electrically. At least the relation described herein under holds for the case that the time constant S of the light switching layer is larger than the time constant D of the display element layer (S>D).

$$(1/C_D)(1/C_D+1/C_S) > V_{th}/V$$

On the other hand, at least the relation described herein under holds for the case that the time constant S of the light switching layer is smaller than the time constant D of the display element layer (S<D).

$$R_D/(R_D+R_S) > V_{th}/V$$

wherein $C_D$ denotes the capacitance component of the display element layer, $R_D$ denotes the resistance component of the display element layer, $C_S$ denotes the capacitance component of the light switching element layer, and $R_S$ denotes the resistance component of the light switching element layer.

The case that layers other than the display element layer and the light switching element layer cannot be ignored electrically will be described herein under. At least the relation described herein under holds for the case that the time constant S of the light switching layer is larger than the time constant of the display element layer (S>D).

$$(1/C_D)(1/C_D+1/C_S+1/C_{ex}) > V_{th}/V$$

At least the relation described herein under holds for the case that the time constant S of the light switching layer is smaller than the time constant of the display element layer (S<D).

$$R_D/(R_D+R_S+R_{ex}) > V_{th}/V$$

Wherein $C_{ex}$ denotes the capacitance component of the layers other than the display element layer and the light switching element layer, and $R_{ex}$ denotes the resistance component of the layers other than the display element layer and the light switching element layer.

As a matter of course, these relations are only for guide line, and may vary depending on the nonlinearity of the element, for example, the voltage dependency. Furthermore, it cannot be true for the case of overshooting.

For example, the element such as cholesteric liquid crystal has been known as such display medium. However, in the case of cholesteric liquid crystal, it is required that the voltage is turned off sharply after voltage application to obtain high reflectance condition.

Furthermore, any of memory elements such as ferroelectric capsulated liquid crystal element, cholesteric liquid crystal element, polymer network stabilized liquid crystal element that is formed of cholesteric liquid crystal, polymer dispersion liquid crystal element that is formed of cholesteric liquid crystal, capsulated liquid crystal element that is formed of cholesteric liquid crystal, electric field rotation element, electrophoretic element, electrophoretic type capsulated element that is formed by capsulating electrophoretic element, electric field moving type particle element, and polymer network stabilized element may be used preferably as the display medium. These materials are suitable for holding without power source, and the medium can be used in the state that the medium is detached from the writing apparatus.

Among these materials, any one of polymer network stabilized liquid crystal element, polymer dispersion liquid crystal element, and capsulated liquid crystal element, that are formed of cholesteric liquid crystal, is more preferably used.

A cholesteric liquid crystal element, polymer network stabilized liquid crystal element, polymer dispersion liquid crystal element, and capsulated liquid crystal element, that are formed of cholesteric liquid crystal, are excellent in display controllability and effective because ON/OFF of the display can be selected stably based on the sharpness that occurs when the voltage is turned off. The reason is that the profile of voltage drop that occurs when the display is turned off is controlled easily by impedance matching control during irradiation with light.

Because the reflectance is controlled based on the sharpness of the voltage drop that occurs when the voltage is turned off in the case of the cholesteric liquid crystal, the gradation is controllable. Furthermore, cholesteric liquid crystal can be used for a display element having the first threshold value $V_{th-1}$ that is served for turning off the display and the second threshold value $V_{th-2}$ that is served for turning on the display when a voltage higher than it is applied, and it is controllable based on the overshooting. As described hereinabove, cholesteric liquid crystal element is the effective element.

For fabrication of the light switching element, amorphous silicon (a-Si:H), CdS, or BSO may be used as inorganic photoconductive material, and diazo-base photosensitive material or phthalocyanine-base material may be used as organic photoconductive material. Among these materials, organic photoconductive material and BSO are preferably used because the value of the resistance component during non-irradiation with light is large and the impedance is large.

Particularly, organic photoconductive material is preferably used for the light switching element layer because the impedance of organic photoconductive material is high. Furthermore, ions are removed completely and the highly reliable liquid crystal has a large time constant. Another reason why organic photoconductive material is used preferably is that the photoconductive material having a large time constant is preferably used for impedance matching control. The controllable range of the time constant based on irradiation with light is wide, and the element can be designed easily. Furthermore, organic photoconductive material is available at low cost, and is suitable for mass-production.

The time constant is measured and determined by an impedance meter, and in the measurement the display element and the light switching element are regarded as a parallel circuit having capacitance component and resistance component respectively. The concept that the equivalent circuit of the respective elements is regarded as a parallel circuit having the resistance component and the capacitance component is described in, for example, "APPLIED OPTICS" 1992 Vol. 31, No. 32b, pp6859.

The present invention is easily applied in the case that a functional layer, reflection layer, and light absorption layer are laminated in addition to the display element layer and light switching element layer. As a matter of course, the present invention can be applied to the case in which a color image is displayed by use of a multiple laminate.

A photo-addressable type recording display apparatus in accordance with an embodiment of the present invention is roughly divided into a recording unit 10 that displays an image, a light writing unit 12 that writes an image on the recording unit 20 with light pattern, and a control unit 14 that controls the recording unit 10 and light writing unit 12 as shown in FIG. 4. Herein, the light writing unit 12 corresponds to the light irradiation unit of the present invention, and the control unit 14 corresponds to the driving control unit of the present invention.

The recording unit 10 is provided with a spatial light modulation element 20 for constituting an image display surface and a driving unit 22 for driving the spatial light modulation element 20. The spatial light modulation element corresponds to the photo-addressable type recording display medium of the present invention, and the driving unit 22 corresponds to the application unit of the present invention.

The spatial light modulation element 20 has the structure in which a light incident side transparent substrate 30, a light incident side transparent electrode layer 32, an organic photoconductive switching element layer 34, a liquid crystal display element layer 36, and a display side transparent electrode layer 38 are interposed in the order of this arrangement between the light incident side transparent substrate 30 and a display side transparent substrate 31 that are faced each other. Herein, the organic photoconductive switching element layer 39 corresponds to the light switching element layer of the present invention, and the liquid display element layer 36 corresponds to the display element layer of the present invention.

Known transparent substrate formed of a material such as glass or plastic may be used for the light incident side transparent substrate 30 and the display side transparent substrate 31 properly, but flexible substrate formed of a material such as polyester film, for example, polyethyleneterephthalate, or other films may be used. The transparent substrate having a thickness of approximately 100 μm to 500 μm is used preferably.

The light incident side transparent electrode layer 32 and the display side transparent electrode layer 38 may be formed of electrode that is light transmittable, and ITO electrode or the like is used preferably.

The liquid crystal display element layer 36 is a layer having a memory element that is selectively reflective or backward scatterable. The liquid crystal display element layer 36 has the structure in which a spacer is disposed between a pair of orientation films for orienting liquid crystal and liquid crystal material is filled in a space partitioned by the spacer. In the case that the liquid crystal display element layer 36 is rendered selectively reflective, cholesteric liquid crystal is filled as the liquid crystal material, and otherwise in the case that the liquid crystal display element layer 36 is rendered backward scatterable, polymer dispersion liquid crystal that uses nematic liquid crystal as the liquid crystal material is filled preferably. As a matter of course, cholesteric liquid crystal may be dispersed to form polymer dispersion liquid crystal, or cholesteric liquid crystal may be capsulated preferably.

Because the light having the wavelength that is necessary for displaying is reflected and the light having the wavelength that is unnecessary for displaying is allowed to be transmitted in the case of selective reflection and backward scattering, in the present embodiment, the organic photoconductive switching element layer 34 is provided on the light incident side of the liquid crystal display element layer 36 to thereby absorb the light that is transmitted through the liquid crystal display element layer 36, and the absorbed light is used for light switching.

Figure 5:
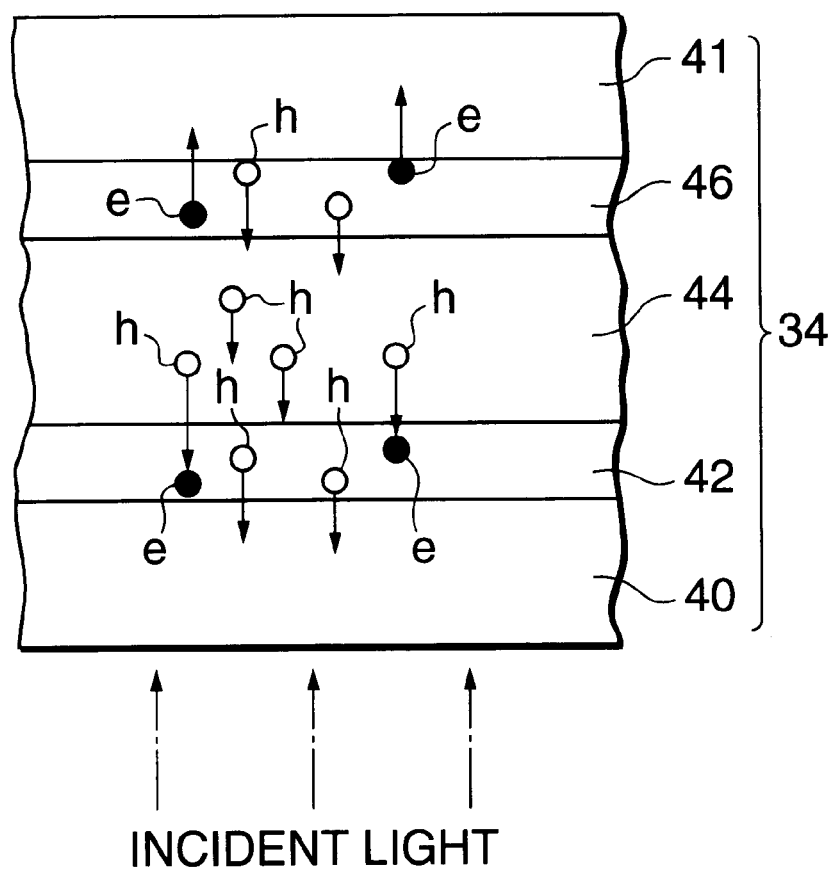
FIG. 5 is a partial cross sectional view illustrating the schematic structure of the organic photoconductive switching element layer shown in FIG. 4.

The organic photoconductive switching element layer 34 of the present embodiment has a charge transport layer (CTL) 44 formed of charge transportive material, charge generation layers (CGL) 42 and 46 provided on both upper side and under side of the charge transport layer (CTL) 44, a first electrode 40 provided on the under side of the under side charge generation layer (tail CGL) 42, and a second electrode 41 provided on the upper side of the upper side charge generation layer (top CGL) 46 as shown in FIG. 5. Such dual CGL structure, in which charge generation layers are laminated on top and bottom of the charge transport layer, allows AC voltage to be applied. Herein, the charge transport layer 44 is formed of hole transportive material.

Such dual CGL structure allows the AC voltage to be applied. In detail, when an organic photoconductive material having a dual CGL structure is irradiated with light, hole h and free electron e are generated in the respective layers, namely the under side charge generation layer (CGL) 42 and the upper side charge generation layer (CGL) 46.

The hole h out of the hole h and free electron e generated in the upper side charge generation layer (CGL) 46 is transported to the charge transport layer (CTL) 44, and combines with the free electron e generated in the under side charge generation layer (CGL) 42. The free electron e generated in the upper side charge generation layer (CGL) 46 impinges into the second electrode 41. Furthermore, the free electron e out of the hole h and free electron e generated in the under side charge generation layer (CGL) 42 combines with the hole h transported to the charge transport layer (CTL) 44, and the hole h generated in the under side charge generation layer (CGL) 42 impinges into the first electrode 40. Thereby, a current flows. Herein, in the case that the electric field is inverted, a current flows in the inverted direction.

Organic material, that generates charges when irradiated with light, such as perylene-base organic material, phthalocyanine-base organic material, bis-azo-base organic material, dithioketo pyrrole-base organic material, squarylium-base organic material, azulenium-base organic material, or thiapyrylium-polycarbonate-base organic material may be used as the charge generation layer material that forms the under side charge generation layer (CGL) 42 and the upper side charge generation layer (CGL) 46.

Dry film forming method such as vacuum evaporation method or spattering method or a method in which solvent or dispersion is used such as spin coat method or dip method may be used as the method for fabricating the under side and upper side charge generation layers 42 and 46 of the present embodiment. In any of these methods, substrate heating and severe process management are not necessary differently from the method for fabricating a-Si:H and photodiode.

The under side and upper side charge generation layers 42 and 46 having a thickness of 10 nm to 1 μm, preferably 20 nm to 500 nm, are preferably used. The film thickness thinner than 10 nm causes insufficient photosensitivity and difficulty in manufacturing of even products, and on the other hand the film thickness thicker than 1 μm causes saturation of photosensitivity and easy separation of the laminate due to in-film stress.

Furthermore, because it is required for the under side and upper side charge generation layers 42 and 46 to generate hole h and free electron e in the same quantity, it is required for both layers to have the sensitivity to the wavelength, light quantity, and voltage in the same level. Therefore, it is desirable that the under side and upper side charge generation layers 42 and 46 are formed of the same material. As a matter of course, different materials may be used as long as the sensitivity of these materials are in the same level.

Trinitrofluorene-base material, polyvinylcarbasole-base material, oxadiazole-base material, pylazoline-base, hydrazone-base material, stilbene-base material, triphenylamine-base material, triphenylmethane-base material, or diamine-base material may be used as the charge transportive material of the charge transport layer (CGL) 44. The ion conductive material such as polyvinylalcohol or polyethyleneoxide that contain added $LiClO_4$ may be used. Particularly, diamine-base material is preferably used because of its sensitivity and hole transportation capability.

Spin coat method or dip method in which solvent or dispersion material is used may be employed as the method for fabricating the charge transport layer in addition to the dry film forming method such as vacuum evaporation method or spattering method. The film thickness of the charge transport layer ranges from 0.1 μm to 100 μm, preferably from 1 μm to 10 μm. The film thickness thinner than 0.1 μm causes difficulty in impedance matching with the functional element and resultantly causes difficulty in designing, and the above-mentioned range is preferably used.

In addition to the above-mentioned structure, it is possible to add the functional layer. For example, a functional layer for protecting impingement of carrier disposed between an electrode and a charge generation layer is formed, a reflection layer or a shading layer is formed, DC component removing functional layer is formed, or a functional layer that is served for these plural functions may be formed. These functional layers may be added as long as the functional layer does not disturb the current flow.

Though the organic photoconductive switching element layer 34 having the dual CGL structure is described in the present embodiment, not only the dual CGL structure but also organic photoconductive element and amorphous silicon element having other structure may be used as long as the element layer having the structure is an optical functional layer that is capable of light absorption and capable of photoelectric transformation for converting the absorbed light to the charge in quantity equivalent to the absorbed light.

The driving unit 22 for driving the spatial light modulation element 20 is provided with a connector 28 for connecting to the above-mentioned light incident side transparent electrode layer 32 and the display side transparent electrode layer 38 and a driving pulse generation unit 29. The driving pulse generation unit 29 detects a trigger signal for the driving waveform output supplied from a control unit 14 that will be described hereinafter, generates a driving pulse based on the detection of the trigger signal, and applies the driving pulse on the light incident side transparent electrode layer 32 and the display side transparent electrode layer 38 through the connector 28. Thereby, an electric filed is generated between the light incident side transparent electrode layer 32 and the display side transparent electrode layer 38. Herein, the connector 28 is detachable.

The driving pulse generation unit 29 has, for example, a waveform memory unit such as ROM and a DA conversion unit. The waveform memory unit stores waveforms, for example, as shown in FIG. 2, and the DA conversion unit DA-converts the waveform read out from the ROM and generates a driving pulse. Any unit having different structure may be used as long as the unit can apply the driving pulse, for example, a unit having the structure that generates the pulse by use of an electric circuit such as a pulse generation circuit may be used.

The light writing unit 12 is roughly divided into a pattern generation unit 50 that generates a pattern correspondingly to an image data, and a light irradiation unit 52 that irradiates the light incident side transparent substrate 30 of the spatial light modulation element 20 with the pattern generated from the pattern generation unit 50 as the pattern of the light. The light writing unit 12 performs irradiation with the pattern of the light formed correspondingly to the image data from the image display surface side of the spatial light modulation element 20 based on the indication supplied from the control unit 14 for light writing.

For example, a transmission type display such as TFT liquid crystal display or simple matrix type liquid crystal display may be used as the pattern generation unit 50. Any lighting unit may be used as the light irradiation unit 52 as long as the lighting unit can be used to irradiate the spatial light modulation element 20 with a light such as fluorescent light, halogen lamp, or electroluminescence (EL) light.

Furthermore, the pattern generation unit 50 and the light irradiation unit 52 may be formed separately as independent components, or may be formed combinedly as a unified component. In the case of the unified component, for example, an emission type display such as EL display, CRT, or field emission display (FED) may be used. Other than these components, any illumination unit that is capable of controlling the light quantity, wavelength, and irradiation pattern for irradiating the spatial light modulation element 20 may be used. As a matter of course, the color of the light source is not limited to white, and chromatic light obtained by use of a filter may be used.

The control unit 14 is connected to external apparatuses such as a personal computer. The control unit 14 converts the image data supplied from an external apparatus to the image data to be used for displaying and controls the light writing unit 12 and the driving unit 22 synchronously. For example, when the image data is supplied from an external apparatus and a writing indication that indicates writing of the image data on the spatial light modulation element 20 is supplied to the control unit 14, the control unit 14 supplies a trigger signal corresponding to the comparative magnitude between the time constant D of the liquid crystal display element layer 36 and the time constant S of the organic photoconductive switching element layer 34 to the driving unit 22, and supplies the image data to be used for displaying that has been obtained by converting the input image data to the light writing unit 12.

Furthermore, the control unit 14 determines the magnitude and application time of the voltage that is to be applied on the spatial light modulation element 20 by the driving unit 22 so that the threshold value corresponds to the waveform determined correspondingly to the comparative magnitude relation between the time constant D of the liquid crystal display element layer 36 and the time constant S of the organic photoconductive switching element layer 34 during irradiation with light and during non-irradiation with light of the light writing unit 12, and supplies the trigger signal for driving waveform output to the driving unit 22.

The control unit 14 controls the driving of the light writing unit 12 and driving unit 22 so as to meet with the combination of the switching between irradiation with light/non-irradiation with light that is corresponding to the voltage waveform shown in FIG. 2, the comparative magnitude relation between the time constant D of the liquid crystal display element layer 36 and the time constant S of the organic photoconductive switching element layer 34, and the ON/OFF switching of the liquid crystal display element layer 36.

For example, the cases that the D<<S during non-irradiation with light and D>>S during irradiation with light in the comparative magnitude relation between the time constant D of the liquid crystal display element layer 36 and the time constant S of the organic photoconductive switching element layer 34 will be described. The control unit 14 supplies the trigger signal to the driving unit 22 so that an applied voltage equal to or higher than the threshold value Va for a duration that is sufficiently long to change the phase is applied on the liquid crystal display element layer 36 during non-irradiation with light. On the other hand, during irradiation with light, the control unit 14 controls the magnitude and the application time of the voltage applied to the spatial light modulation element 20 so that a voltage lower than the threshold value Vb is applied for an application time is applied on the liquid crystal display element layer 36. Otherwise, the control unit 14 controls so that the voltage equal to or lower than the threshold value b is applied on the liquid crystal display element layer 36 due to the effect of the waveform transformation.

Furthermore, the cases that the D<S during non-irradiation with light and D≧S during irradiation with light in the comparative magnitude relation between the time constant D of the liquid crystal display element layer 36 and the time constant S of the organic photoconductive switching element layer 34 will be described. The control unit 14 supplies the trigger signal to the driving unit 22 so that a voltage higher than the threshold voltage Va having a magnitude that is sufficiently high to change the phase is applied continuously on the liquid crystal display element layer 36. In this state, the control unit 14 controls the voltage applied to the photo-addressable type recording display medium so that a voltage equal to or higher than the threshold value is applied on the liquid crystal display element layer 36 for a duration that is sufficiently long to change the phase during irradiation with light. The control unit 14 controls the voltage applied to the photo-addressable type recording medium so that a voltage having a voltage amplitude of the magnitude that turns off the display due to voltage drop in the duration from the time when the voltage drops to an amplitude equal to or lower than the threshold value to the time when the voltage is turned off is applied for an application time on the liquid crystal display element layer 36.

Though two cases are described exemplarily herein, the control unit 14 of the present embodiment controls the voltage applied to the photo-addressable type recording display medium and also controls the irradiation with light by use of the light writing unit 12 not only in the two cases described hereinabove but also in all the cases shown in FIG. 3.

Furthermore, the case in which the dual CGL organic photoconductive structure is used as the organic photoconductive switching element layer 34 is described exemplarily in the present embodiment, but as a matter of course the present invention is by no means limited to the dual CGL organic photoconductive structure, and organic photoconductor having other structure or amorphous silicon may be used as the organic photoconductive switching element layer 34.

EXAMPLE

Figure 6:
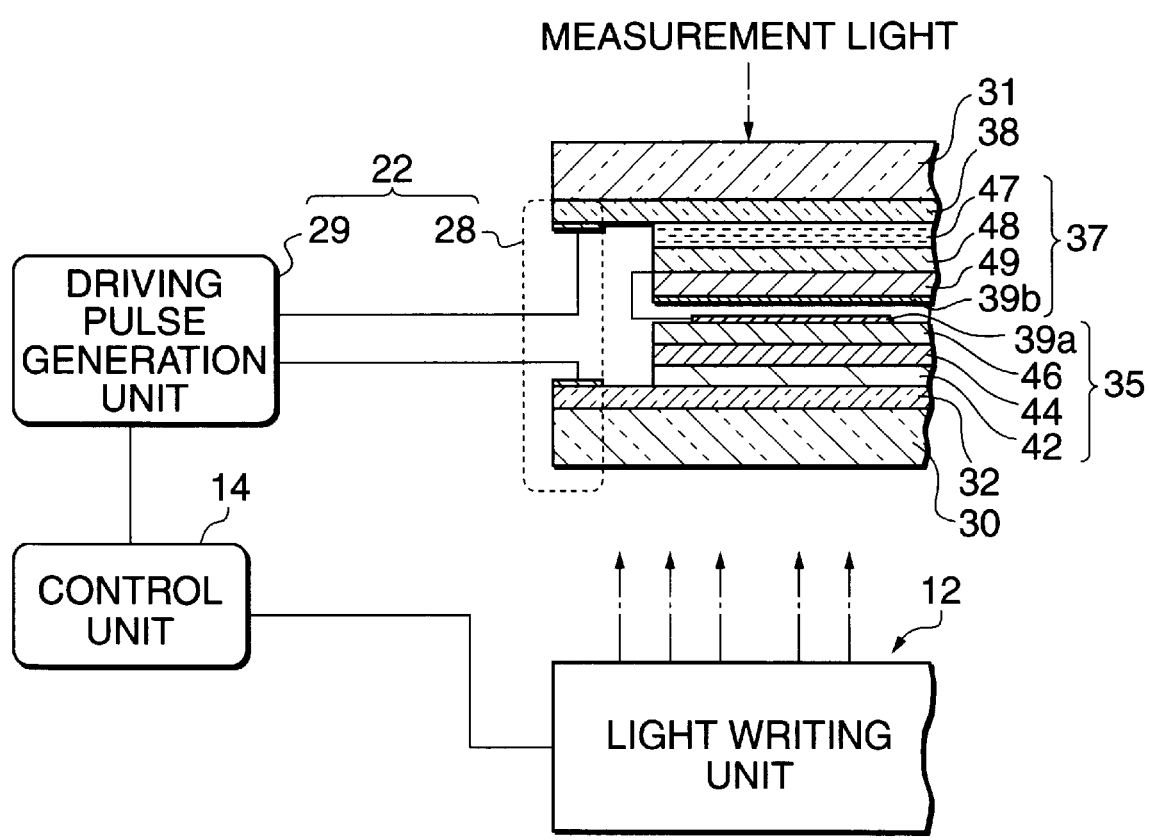
FIG. 6 is a explanatory diagram illustrating the schematic structure of the observation example 1 to the observation example 3.

At first, the observation experiment was carried out to determine the condition of the application voltage and the application time before the example was fabricated. The observation experiment was carried out as described herein under to examine the effect of impedance matching control. A liquid crystal display element cell 37 having the same structure as that of the liquid crystal display element layer 36 of the photo-addressable type recording display medium, a functional layer, and an organic photoconductive switching element cell 35 having the same structure as that of the organic photoconductive switching element layer 34 were fabricated independently. The capacitance component and the resistance component of respective liquid crystal display element cell 37 and organic photoconductive switching element cell 35 were measured. Then, the liquid crystal display cell 37 and the organic photoconductive switching element cell 35 were laminated so as to be connected electrically in series as shown in FIG. 6. The applied voltage applied on the liquid crystal display element cell 37 and the reflectance change corresponding to the applied voltage were measured by a reflectivity measuring device (X-Rite) during irradiation with light and during non-irradiation with light.

Glass substrates were formed for using as the light incident side transparent substrate 30 and the display side transparent substrate 31, and ITO films were formed for using as the light incident side transparent electrode layer 32 and the display side transparent electrode layer 38. The ITO film was served also as the first electrode 40 in the dual CGL structure.

The organic photoconductive switching element cell 35 had the dual CGL structure formed by successively laminating an under side charge generation layer 42, a charge transport layer 44, and an upper side charge generation layer 46, and in the observation experiment an Au electrode 39a was formed on the uppermost layer for connecting to the liquid crystal display element cell 37. The resistance was adjusted by controlling the film thickness of the charge generation layers 42 and 46 and the charge transport layer 44, and the capacitance component was adjusted by controlling the film thickness of the charge transport layer 44.

The liquid crystal display element cell 37 had the structure formed by successively laminating a liquid crystal layer 47 that was served as the display element, a transparent electrode substrate 48, a substrate 49, and a shading layer 39b in the order from the display side transparent electrode layer 38. The liquid crystal display element cell 37 and the organic photoconductive switching element cell 35 were disposed so that the shading layer 39b of the liquid crystal display element cell 37 was faced to the Au electrode 39a side of the organic photoconductive switching element cell 35, and were disposed so that the reflectance could be measured from the display side transparent electrode layer 38 side.

Cholesteric liquid crystal having a threshold value of from approximately 40 V/5 µm to 50 V/5 µm was used for the liquid crystal layer 47. A voltage of approximately 40 V/5 µm to 50 V/5 µm was applied for a duration of 5 ms or longer on the liquid crystal display element cell 37, and then the voltage was dropped at a rate of approximately 50 V/5 ms.

When the voltage was dropped to 10 V, the voltage became planar and the reflectance became as high as approximately 15% (display-on). In the case of the voltage drop rate equal to or slower than the value described hereinabove, the voltage became focal, and the reflectance became low at that time (display-off). The resistance component was adjusted by changing the degree of purification.

The control unit 14 was structured so that a pulse generator connected to an amplifier applied the writing pulse. A halogen light source was used as the light writing unit 12.

An example was fabricated after the observation experiment, and similarly a comparative example was fabricated after the reflectance change was measure by use of the reflectivity measuring device and the reflectance change was measure by use of the reflectivity measuring device. The observation example, the example, and the comparative example are described in this order herein under.

First Example (1) Observation Example 1

At first, an ITO film that was served as the light incident side transparent electrode layer 32 was formed on a glass substrate that was served as the light incident side transparent substrate 30. Benzimidazole perylene (BZP) was vapor-deposited on the transparent substrate having the ITO film to form a BZP film having a film thickness of approximately 0.08 µm and it was served as the under side charge generation layer 42.

A mixed solution containing 7.2% of biphenyldiamine-base material, 10.8% of polycarbonate bis-phenol-Z (poly (4,4'-cyclohexylidene-diphenylene-carbonate)), and 82% of monochlorobenzene was diluted doubly with monochlorobenzene to prepare a dilute solution, and the dilute solution was coated to form a film having a film thickness of approximately 3 µm by spin coat method, and the film was served as the charge transport layer 44.

Furthermore, a BZP film having a film thickness of approximately 0.08 µm was formed on the upper layer of the charge transport layer 44 in the same manner as used to form the under side charge generation layer 42 described hereinabove, the BZP film was served as the upper layer side charge generation layer 46, an Au electrode was formed on the upper layer of the upper layer side charge generation layer 46 by spattering, and an organic photoconductive switching element cell 35 was obtained.

The impedance caused when a light of 30 µW/cm² was irradiated onto the organic photoconductive switching element cell 35 (during irradiation with light) had the capacitance component of 1 nF/cm² and the resistance component of 2 MΩ/cm², and the time constant was therefore 2 ms. Furthermore, the impedance caused when irradiation with a light of 1 µW/cm² or lower was performed had the capacitance component of 1.2 nF/cm² and the resistance component of 80 MΩ/cm², and the time constant was therefore 96 ms.

Furthermore, an ITO film was formed as the display side transparent electrode 38 on a glass substrate that was served as the display side transparent substrate 31. On the transparent substrate having the ITO film, spherical HAYA-BEADS L-25 (brand name of Hayakawa Rubber Co., Ltd.) having a diameter of 5 µm with adhesive was wet-sprayed, and another glass substrate having an ITO film was placed on it closely so that the ITO film was in contact with the spacer to form a cell frame. After the above-mentioned process was carried on in a room temperature, the cell frame was heated to 110° C. for 30 min, and the spacer was bonded to films to obtain an OPC liquid crystal cell frame.

Cholesteric liquid crystal, that selectively reflects blue color light, was injected into the OPC liquid crystal cell frame to obtain a liquid crystal display element cell 37. The injected cholesteric liquid crystal was a mixture of 64.9% by weight of nematic liquid crystal ZLI 4398 (brand name of Merck Japan Ltd.) having the positive ferroelectric anisotropy, 17.5% by weight of dextro-rotatory chiral CB 15 (brand name of Merck Japan Ltd.), and 17.5% by weight of dextro-rotatory chiral CE 2 (brand name of Merck Japan Ltd.). The impedance of the obtained liquid crystal display element cell 37 had the capacitance component of 1 nF/cm² and the resistance component of 50 MΩ/cm², and the time constant was therefore 50 ms.

Figure 7:
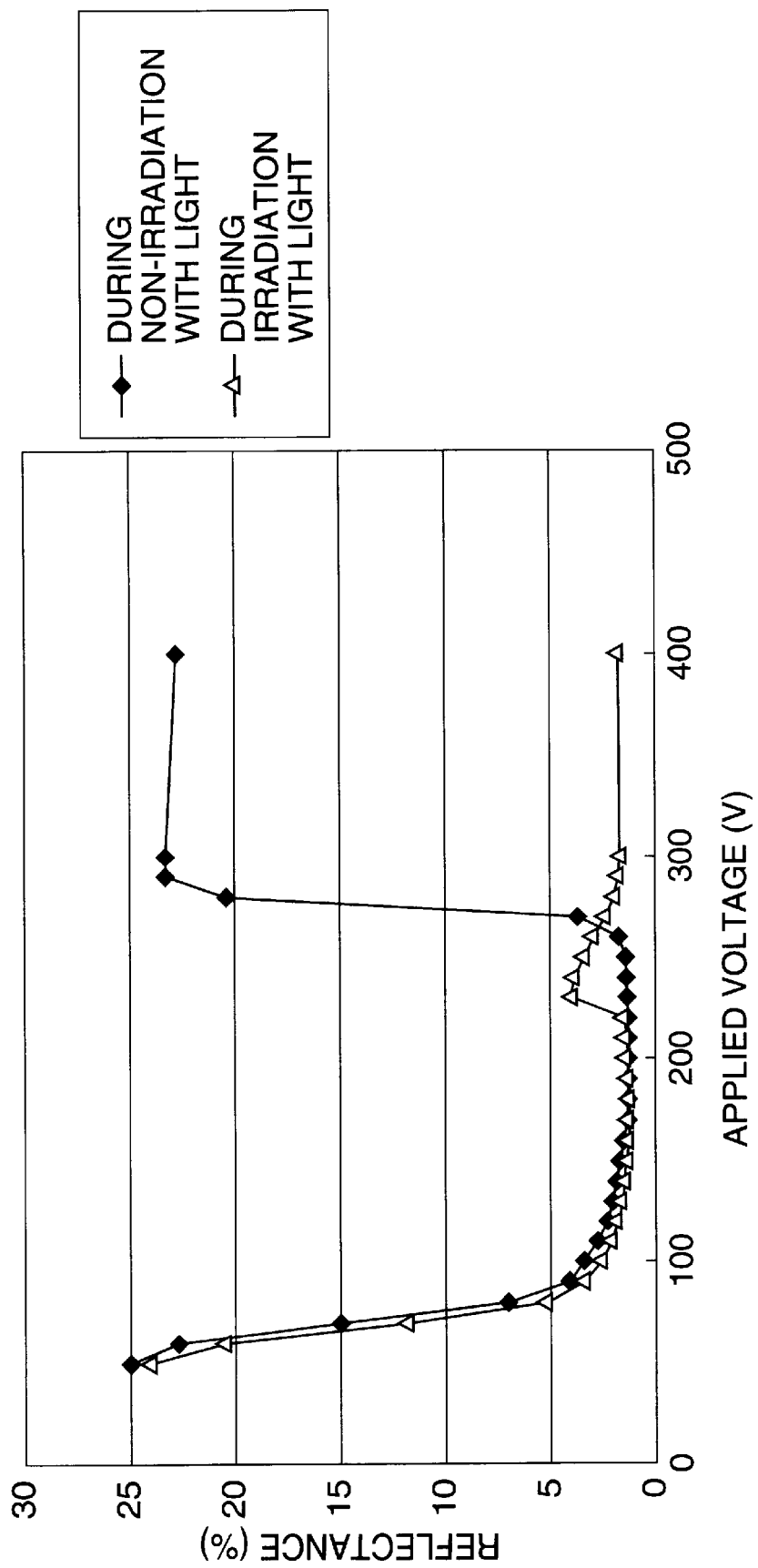
FIG. 7 is a graph showing the relation between the reflectance change and the applied voltage for the liquid crystal display element cell of the observation example 1 during non-irradiation with light and during irradiation with light.

Herein, FIG. 7 shows the relation between the reflectance change and the applied voltage in the case of the liquid crystal display element cell 37 of the observation example 1. The time constant of the liquid crystal display element cell 37 was 50 ms, and the time constant of the light writing switching element was 96 ms during non-irradiation with light and 2 ms during irradiation with light.

In FIG. 7, the black rhomboid curve shows the reflectance change characteristic during non-irradiation with light, and the white triangle curve shows the reflectance change during irradiation with light.

It is obvious from FIG. 7 that the liquid crystal display element cell 37 has a threshold value around 280 V during non-irradiation with light, but does not have a clear threshold value during irradiation with light. Therefore, the liquid crystal display element cell 37 is turned on when a voltage approximately equal to or lower than 100 V or a voltage approximately equal to or higher than 280 V is applied during non-irradiation with light, or when a voltage approximately equal to or lower than 100 V is applied during irradiation with light because the reflectance is approximately equal to or higher than 23%. On the other hand, the liquid crystal display element cell 37 is turned off when a voltage approximately equal to or higher than 100 V and equal to or lower than 280 V is applied during non-irradiation with light or when a voltage equal to or higher than 100 V is applied during irradiation with light.

The reflectance characteristic was measured in the case that a functional element having the capacitance component of 40 nF/cm² and the resistance component of 2 KΩ/cm² was connected equivalently to the functional layer of a recording display medium as a functional layer, and almost the same result as obtained in the case of no functional element was obtained.

(2) Example 1

In the present example 1, the switching element cell formed of organic photoconductive material was prepared as a light switching element to evaluate the waveform observed when AC voltage was applied. Furthermore, the memory display element and the switching element formed of organic photoconductive material were combined as a unified element, and an apparatus that was used for confirming that it was suitable for displaying an image.

At first, an ITO film was formed as the light incident side transparent electrode layer 32 on a glass substrate that was served as the light incident side transparent substrate 30. Benzimidazole perylene (BZP) was vapor-deposited to form a BZP film having a film thickness of approximately 0.08 $\mu$m on the transparent substrate having the ITO film to form the under side charge generation layer 42.

On the upper layer of the under side charge generation layer 42, a mixed solution containing 7.2% by weight of biphenyldiamine-base charge transport agent, 10.8% by weight of Polycarbonate bisphenol-Z (poly(4,4'-cyclohexylidene-diphenylne carbonate)), and 82% by weight of monochlorobenzene that was doubly diluted with monochlorobenzene was coated to form a film having a film thickness of approximately 3 $\mu$m by spin coat method, and this film was served as the charge transport layer 44.

Furthermore, on the upper layer of the charge transport layer 44, a BZP film having a film thickness of approximately 0.08 $\mu$m was formed in the same manner as used for preparation of the above-mentioned under side charge generation layer 42, and this BZP film was served as the upper side charge generation layer 46. As the result, the organic photoconductive switching element layer 34 having the dual CGL structure was formed.

Furthermore, on the upper layer of the upper side charge generation layer 46, a metal-oxide shading film containing polyvinylalcohol binder having a film thickness of approximately 1 $\mu$m was coated and dried by spin coat method to form the shading layer 39c.

Furthermore, on the upper layer of the shading layer 39c, spherical spacer HAYABEADS L-25 (brand name of Hayakawa Rubber Co., Ltd.) having a diameter of 5 $\mu$m with adhesive was wet-sprayed, and a glass substrate having an ITO film was placed in contact with the spacer closely to form a cell frame. The above-mentioned process was carried out in a room temperature, and the cell frame was heated to 110° C. for 30 min to obtain the OPC liquid crystal cell frame in which the spacer and films were in contact closely.

In the OPC liquid crystal cell frame, cholesteric liquid crystal, that selectively reflects blue color light, was injected to form the liquid crystal display element layer 36. The injected cholesteric liquid crystal was a mixture of 64.9% by weight of nematic liquid crystal ZLI 4389 having the positive ferroelectric anisotropy (brand name of Merck Japan Ltd.), 17.5% by weight of dextro-rotatory chiral CB 15 (brand name of Merck Japan Ltd.), and 17.5% by weight of dextro-rotatory chiral CE 2 (brand name of Mer ck Japan Ltd.) as in the case of the above-mentioned observation example 1. Herein, this spatial light modulation element 20 was structured so as to be easily detachable from the apparatus body by use of the connector.

Figure 8:
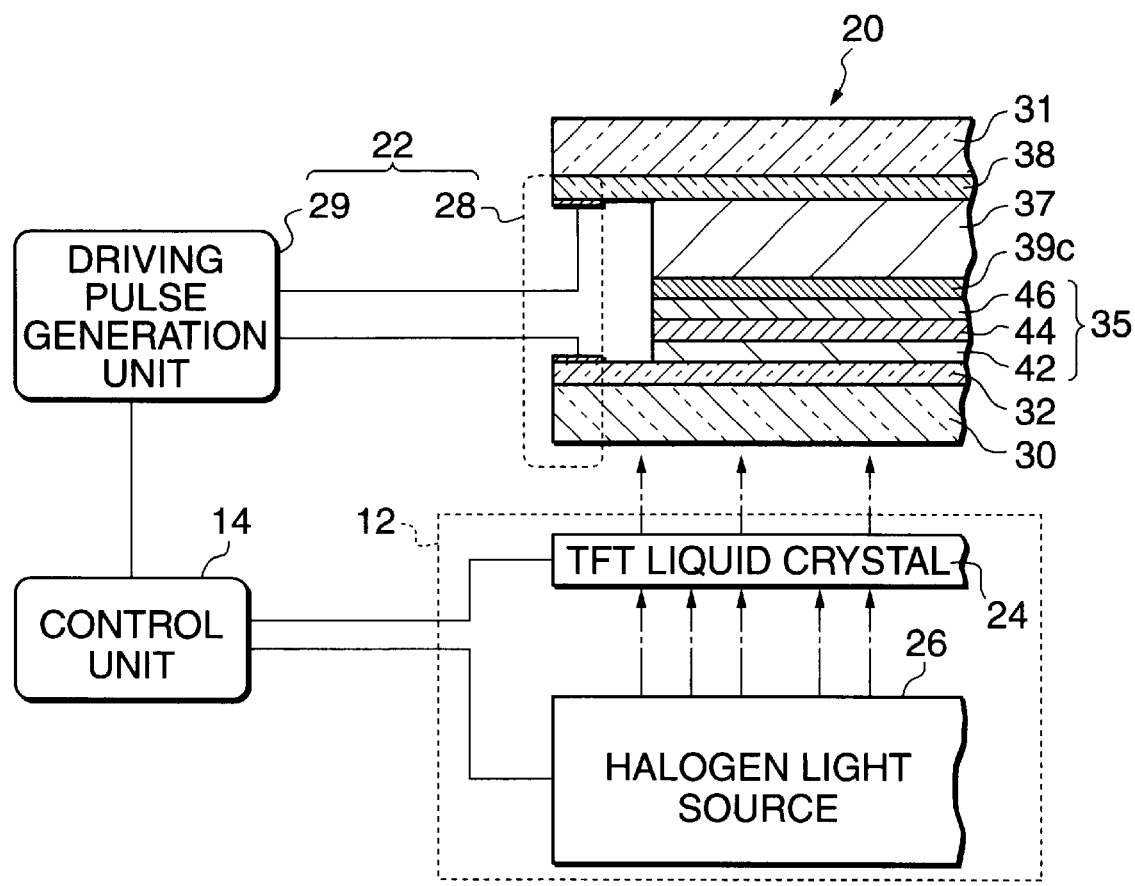
FIG. 8 is an explanatory diagram illustrating the schematic structure of the example 1 to the example 3.

The spatial light modulation element 20 having the structure as described hereinabove was connected to the connector 28 as shown in FIG. 8, a monochromatic equivalent type TFT liquid crystal 24 was placed in contact closely in order to enter an image, and the spatial light modulation element 20 was irradiated with the pattern light from the image of the TFT liquid crystal 24. Simultaneously, 4 rectangular waveform pulses of 50 Hz and 300 V was applied by the driving pulse generation unit 29, and an image was formed on the spatial light modulation element 20. The intensity of the light from the halogen light source 26 was adjusted so that the irradiation area of the organic photoconductive switching element layer 34 was irradiated with the light quantity of 30 $\mu$W/cm$^2$ and the non-irradiation area was irradiated with the light quantity of 1 $\mu$W/cm$^2$.

(3) Comparative Example 1

The same structure as used in the observation example 1 was used. The irradiation with light quantity of 10 mW/cm$^2$ was performed so that the resistance component value equal to or smaller than 1/100 of the liquid crystal display element cell 37 of the observation example 1 was obtained, and as the result the resistance component of 200 K$\Omega$/cm$^2$ and capacitance component of 1 nF/cm$^2$ were obtained. The same method as used in the observation example 1 was used during non-irradiation with light. The relation between the reflectance and the applied voltage was obtained by use of this. The obtained result is shown in FIG. 9.

Figure 9:
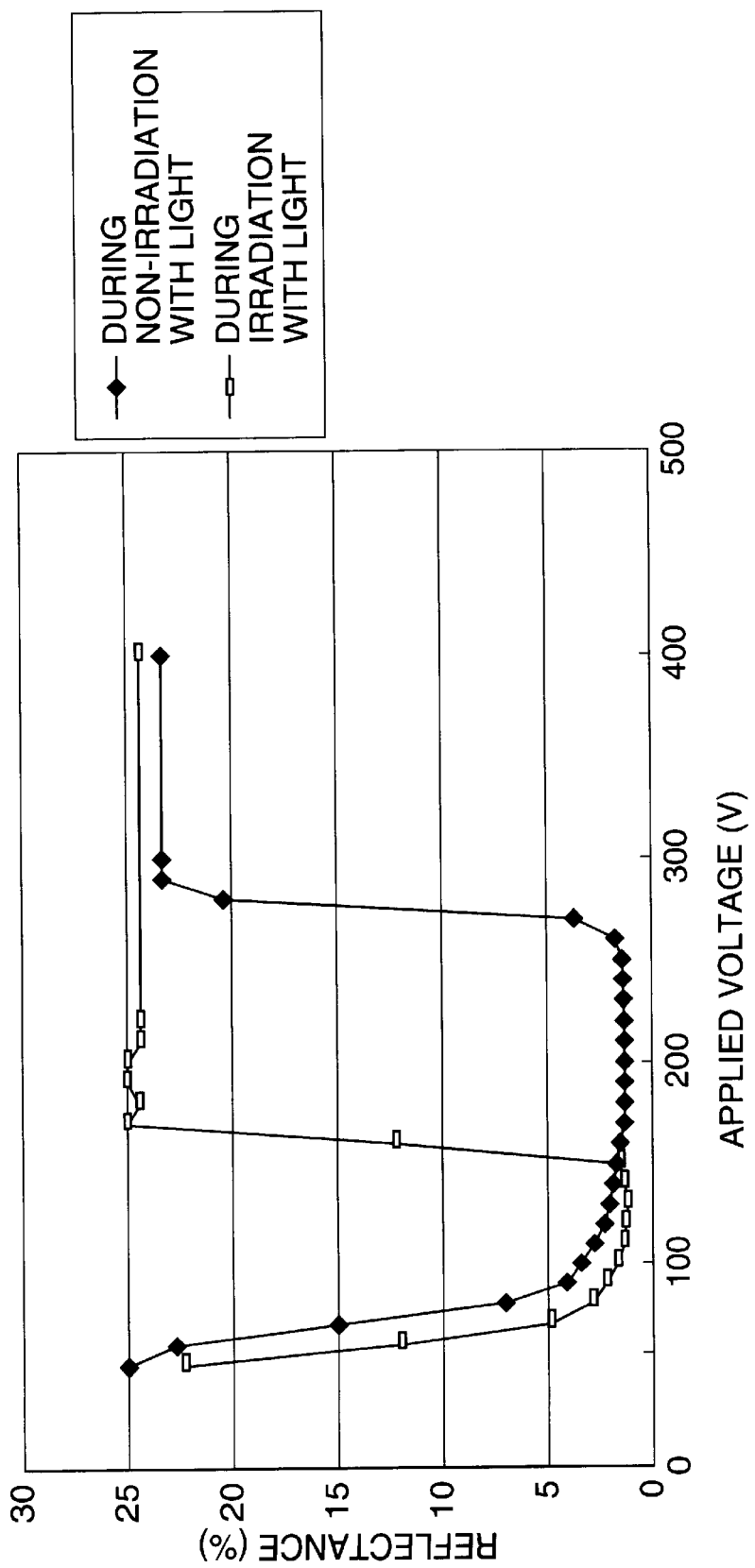
FIG. 9 is a graph showing the relation between the reflectance change and the applied voltage for the liquid crystal display element cell of the comparative example 1 during non-irradiation with light and during irradiation with light.

In FIG. 9, the black rhomboid curve shows the reflectance change characteristic during non-irradiation with light, and the white rectangle curve shows the reflectance change characteristic during irradiation with light.

(4) Evaluation 1

Though the recording was possible in the observation example 1 and also in the comparative example 1, the light quantity of 30 $\mu$W/cm$^2$ was sufficient for recording in the case of the observation example 1, that is, the observation example 1 was highly sensitive, on the other hand the light quantity of 10 mW/cm$^2$ was required for recording in the case of the comparative example 1. From this result, it was found that the sensitivity was significantly improved.

Therefore, in the example 1 in which the liquid crystal display element cell 37 and the organic photoconductive switching element cell 35 of the observation example 1 were combined to form a unified component, the light quantity of 30 $\mu$W/cm$^2$ was sufficient to record a desired image as in the case of the observation example 1. The recording display did not exhibit deterioration even after 1000 cycle repetition. The recording voltage equal to or higher than 280 V was sufficient and the margin equal to or higher than 100 V was confirmed.

Second Example (1) Observation Example 2

At first, an ITO film was formed as the light incident side transparent electrode layer 32 on a glass substrate that was served as the light incident side transparent substrate 30. TiO-phthalocyanine was vapor-deposited on the transparent substrate having the ITO film to form a film having a film thickness of approximately 0.04 $\mu$m, and the film was used as the under side charge generation layer 42.

On the upper layer of the under side charge generation layer 42, a diluted solution prepared by doubly diluting with monochlorobenzene a mixture of 7.2% by weight of biphenyl-diamine-base material, 10.8% by weight of Polycarbonate-bisphenol-Z (poly(4,4'-cyclohexylidene-diphenylene carbonate)), and 82% by weight of monochlorobenzene was coated by spin coat method to form a film having a film thickness of approximately 3 $\mu$m, and this film was used as the charge transport layer 44.

Furthermore, on the upper layer of the charge transport layer 44, a phthalocyanine film having a film thickness of approximately 0.04 μm was formed in the same manner as used for forming the above-mentioned under side charge generation layer 42, and this film was used as the upper side charge generation layer 46. An Au electrode was formed by spattering on the upper layer of the upper side charge generation layer 46 to obtain the organic photoconductive switching element cell 35.

The impedance of the organic photoconductive switching element cell 35 under irradiation with light of 30 μW/cm² (during irradiation with light) had the capacitance component of 0.6 nF/cm² and the resistance component of 64 MΩ/cm². Therefore, the time constant was 36 ms. The impedance during irradiation with light equal to or lower than 1 μW/cm² had the capacitance component of 0.6 nF/cm² and the resistance component of 100 MΩ/cm². Therefore, the time constant was 60 ms.

Furthermore, an OPC liquid crystal cell frame was obtained in the same manner as used in the above, cholesteric liquid crystal, that selectively reflects blue color light, having the same composition as used in the above-mentioned observation example 1 was injected in the OPC liquid crystal cell frame to obtain the liquid crystal display element cell 37. The impedance of the obtained liquid crystal display element cell 37 had the capacitance component of 1 nF/cm² and the resistance component of 50 MΩ/cm².

Next, a functional element cell having the capacitance component of 40 nF/cm² and the resistance component of 2 KΩ/cm² was connected. The functional element cell was connected as the functional layer of the equivalently unified recording display medium, the capacitance and resistance did not affect adversely the liquid crystal display element cell 37 and the organic photoconductive switching element cell 35.

Figure 10:
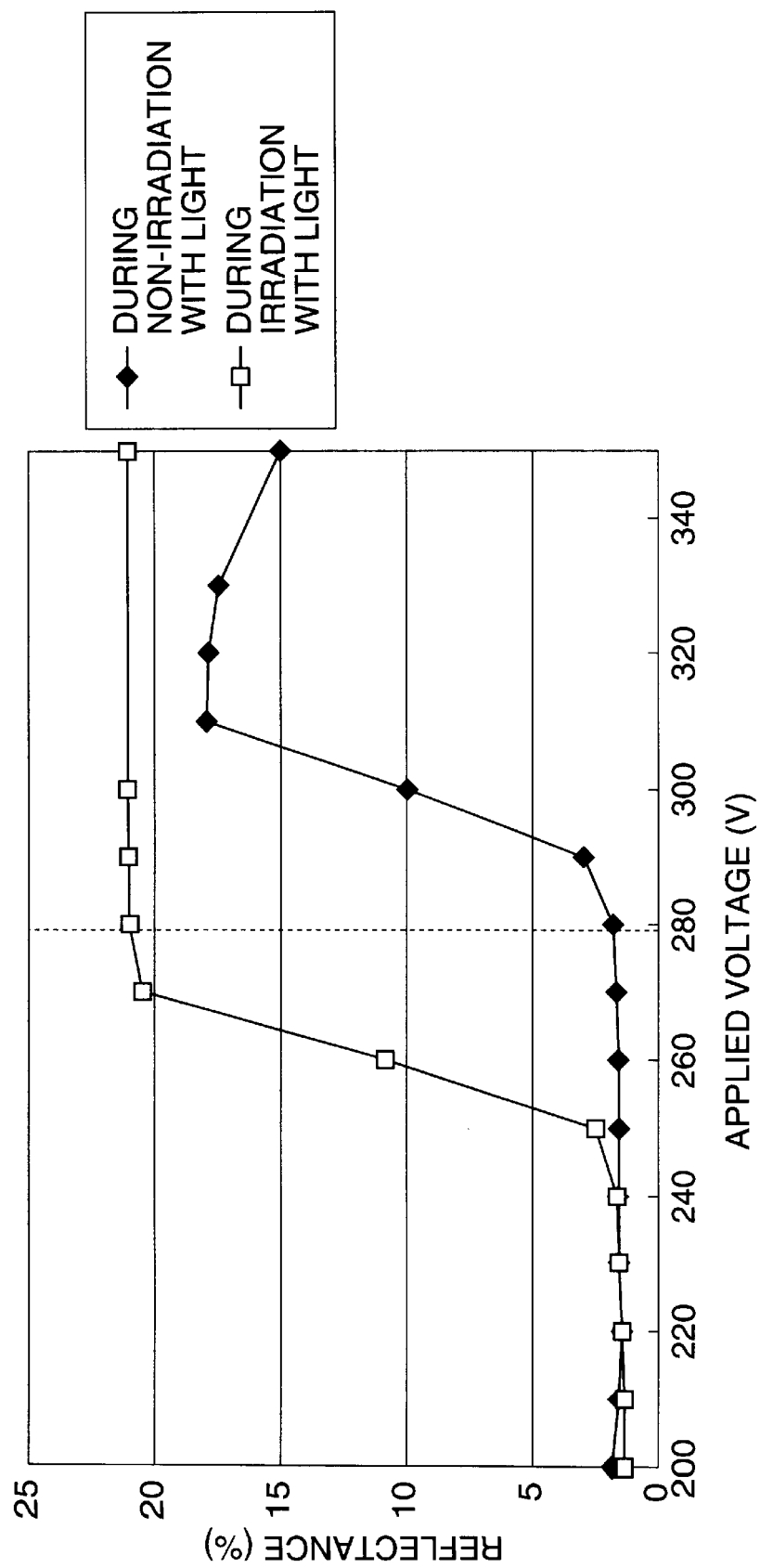
FIG. 10 is a graph showing the relation between the reflectance change and the applied voltage for the liquid crystal display element cell of the observation example 2 during non-irradiation with light and during irradiation with light.

FIG. 10 shows the relation between the applied voltage and the reflectance change of the liquid crystal display element cell 37 of the observation example 2. The time constant of the liquid crystal display element cell 37 was 10 ms, the time constant of the light switching element was 60 ms during non-irradiation with light and 36 ms during irradiation with light.

In FIG. 10, the black rhomboid curve shows the reflectance change characteristic during non-irradiation with light and the white square curve shows the reflectance change characteristic during irradiation with light.

As obvious from FIG. 10, the liquid crystal display element cell 37 has a threshold value around 290 V during non-irradiation with light, and has a threshold value around 250 V during irradiation with light. Therefore, the reflectance is equal to or higher than approximately 20% during irradiation with light in the range from 250 V to 290 V and the display is turned on, and on the other hand the reflectance is equal to or lower than approximately 3% during non-irradiation with light and the display is turned off.

(2) Example 2

In the example 2, a light switching element formed of organic photoconductive material and a memory display element were prepared combinedly, and an apparatus was fabricated to confirm that it was suitably used as an image display apparatus.

At first, TiO-phthalocyanine was vapor-deposited on a transparent substrate having an ITO film to form a film having a film thickness of approximately 0.04 μm, and this film was used as the under side charge generation layer 42.

On the under side charge generation layer 42, a diluted solution prepared by doubly diluting with monochlorobenzene a mixture of 7.2% by weight of biphenyl-diamine-base material, 10.8% by weight of polycarbonate-bisphenol-Z (poly(4,4'-cyclohexylidene-diphenylene carbonate)), and 82% by weight of monochlorobenzene was coated by spin coat method to form a film having a film thickness of approximately 3 μm, and this film was used as the charge transport layer 44.

Furthermore, on the upper layer of the charge transport layer 44, a phthalocyanine film having a film thickness of approximately 0.04 μm was formed in the same manner as used for forming the above-mentioned under side charge generation layer 42, and this film was used as the upper side charge generation layer 46. Thereby, the organic photoconductive switching element layer 34 having the dual CGL structure was formed.

Furthermore, on the upper layer of the upper side charge generation layer 46, a metal-oxide shading film containing polyvinylalcohol binder having a film thickness of approximately 1 μm was coated and dried by spin coat method to form the shading layer 39c.

Furthermore, on the upper layer of the shading layer 39c, an OPC liquid crystal cell frame was formed in the same manner as used in the example 1, cholesteric liquid crystal having the same composition as used in the above-mentioned observation example 1, that selectively reflects blue color light, was injected into the OPC liquid crystal cell frame to form the liquid crystal display element layer 36.

The spatial light modulation element 20 having the structure as described hereinabove was connected to the connector 28 as shown in FIG. 8, a monochromatic equivalent type TFT liquid crystal 24 was placed in contact closely in order to enter an image, and the spatial light modulation element 20 was irradiated with the pattern light from the image of the TFT liquid crystal 24 onto. Simultaneously, 4 rectangular waveform pulses of 50 Hz and 280 V was applied by the driving pulse generation unit 29, and an image was formed on the spatial light modulation element 20. The intensity of the light from the halogen light source 26 was adjusted so that the irradiation area of the organic photoconductive switching element layer 34 was irradiated with the light quantity of 100 μW/cm² and the non-irradiation area was irradiated with the light quantity of 1 nW/cm².

(3) Comparative Example 1

The same structure as used in the observation example 1 was used. The irradiation with light quantity of 100 mW/cm² was performed so that the resistance component value equal to or smaller than 1/100 of the liquid crystal display element cell 37 of the observation example 1 was obtained, and as the result the resistance component of 100 KΩ/cm² and capacitance component of 1 nF/cm² were obtained. The same method as used in the observation example 2 was used during non-irradiation with light.

(4) Evaluation 2

Though the recording was possible in the observation 2 and also in the comparative example 2, the light quantity of 100 μW/cm² was sufficient for recording in the case of the observation example 2, that is, the observation example 2 was highly sensitive, on the other hand the light quantity of 100 mW/cm was required for recording in the case of the comparative example 2. From this result, it was found that the sensitivity was significantly improved.

Therefore, in the example 2 in which the liquid crystal display element cell 37 and the organic photoconductive switching element cell 35 of the observation example 2 were combined to form a unified component, the light quantity of 100 μW/cm was sufficient to record a desired image as in the case of the observation example 2. The recording display did not exhibit deterioration even after 1000 cycle repetition.

Third Example (1) Observation Example 3

At first, an ITO film that was served as the light incident side transparent electrode layer 32 was formed on a glass substrate that was served as the light incident side transparent substrate 30. Benzimidazole perylene (BZP) was vapor-deposited on the transparent substrate having the ITO film to form a BZP film having a film thickness of approximately 0.02 $\mu$m and it was served as the under side charge generation layer 42.

On the under side charge generation layer 42, a charge transport film having a film thickness of approximately 3 $\mu$m was formed in the same manner as used in the observation example 1, and this film was used as charge transport layer 44.

Furthermore, a BZP film having a film thickness of approximately 0.02 $\mu$m was formed on the upper layer of the charge transport layer 44 in the same manner as used to form the under side charge generation layer 42 described hereinabove, the BZP film was served as the upper layer side charge generation layer 46, an Au electrode was formed on the upper layer of the upper layer side charge generation layer 46 by spattering, and an organic photoconductive switching element cell 35 was obtained.

The impedance caused when the organic photoconductive switching element cell 35 was irradiated with a light of 100 $\mu$W/cm$^2$ (during irradiation with light) had the capacitance component of 0.6 nF/cm$^2$ and the resistance component of 7 M$\Omega$/cm$^2$, and the time constant was therefore 4.2 ms. Furthermore, the impedance caused when irradiation with a light of $\mu$W/cm2 or lower was performed had the capacitance component of 0.6 nF/cm$^2$ and the resistance component of 42 M$\Omega$/cm$^2$, and the time constant was therefore 25.2 ms.

Furthermore, an OPC liquid crystal cell frame was obtained in the same manner as used in the above, and cholesteric liquid crystal, that selectively reflects blue color light, having the same composition as that used in the above-mentioned observation example 1 was injected in the OPC liquid crystal cell frame to obtain the liquid crystal display element cell 37. The impedance of the obtained liquid crystal display element cell 37 had the capacitance component of 1 nF/cm$^2$ and the resistance component of 40 M$\Omega$/cm$^2$. Therefore, the time constant was 40 ms.

Next, a functional element cell having the capacitance component of 40 nF/cm$^2$ and the resistance component of 2 K$\Omega$/cm$^2$ was connected. The functional element cell was connected as the functional layer of the equivalently unified recording display medium, the capacitance and resistance did not affect adversely the liquid crystal display element cell 37 and the organic photoconductive switching element cell 35.

Figure 11:
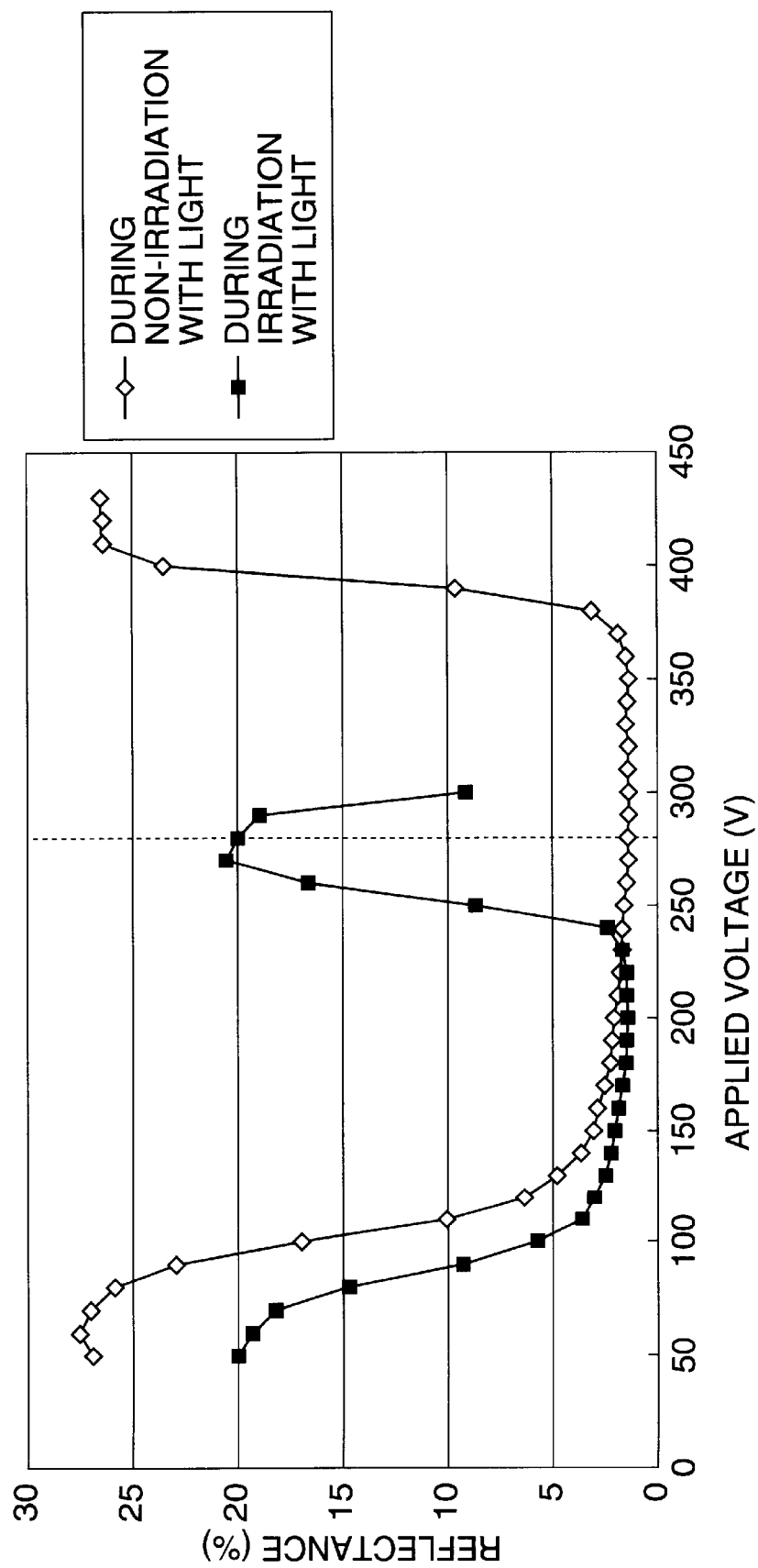
FIG. 11 is a graph showing the relation between the reflectance change and the applied voltage for the liquid crystal display element cell of the observation example 3 during non-irradiation with light and during irradiation with light.
Figure 12:
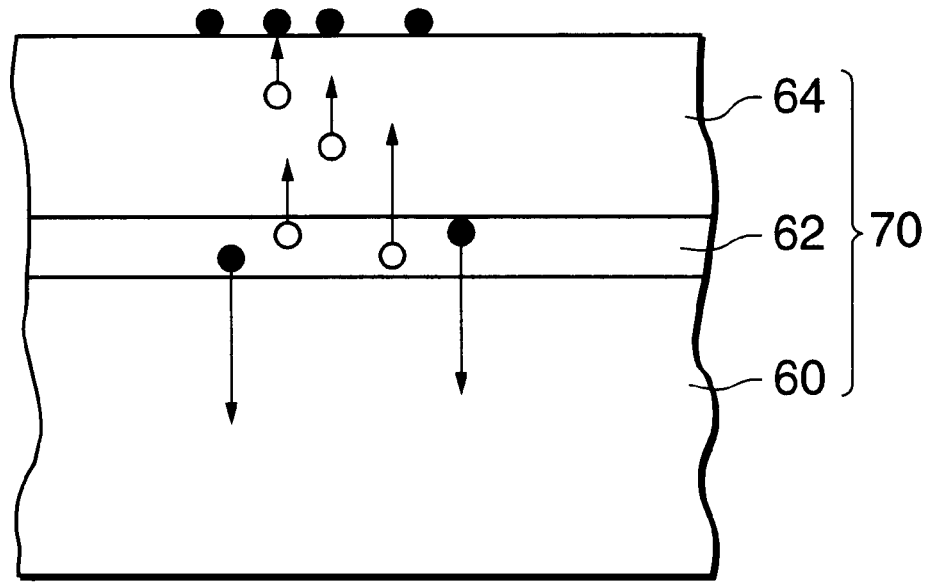
FIG. 12 is an explanatory diagram illustrating the general schematic structure of a photo-addressable type recording display medium provided with a conventional display element and light switching element.
Figure 13A:
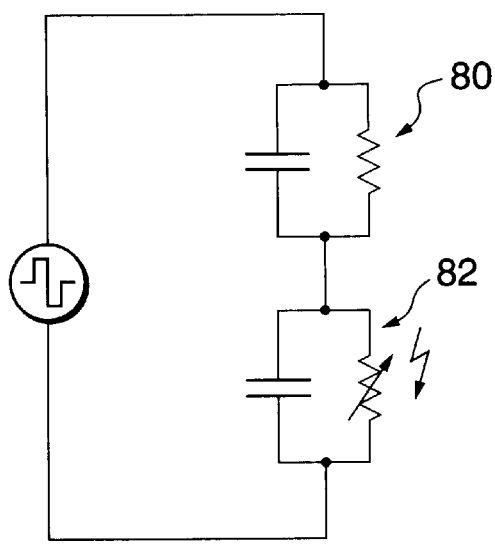
FIG. 13A and FIG. 13B are circuits that electrically represent photo-addressable type recording display medium provided with a display element and light switching element.
Figure 13B:
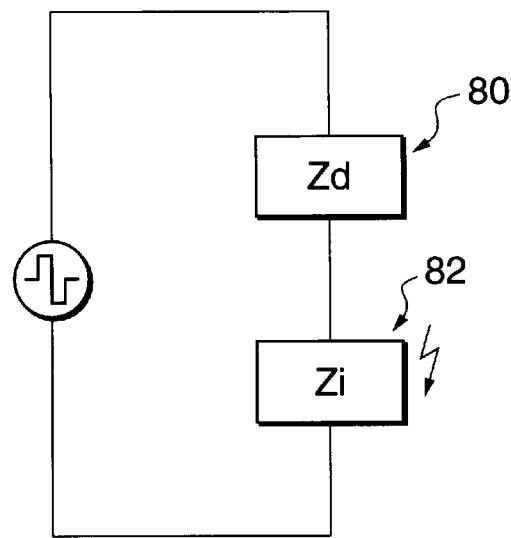
Figure 14:
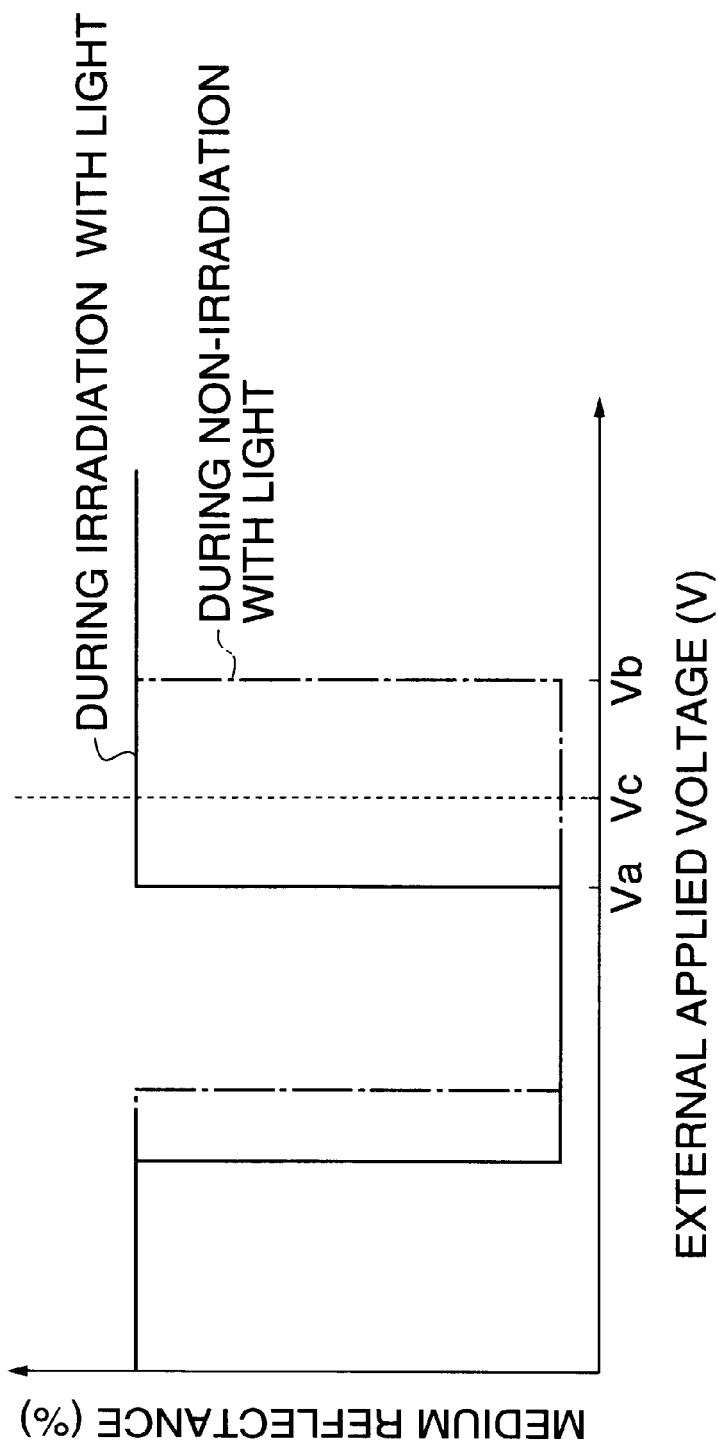
FIG. 14 is a graph showing the relation between the applied voltage and the reflectance change for a conventional photo-addressable type recording display medium during non-irradiation with light and during irradiation with light.

FIG. 11 shows the relation between the applied voltage and the reflectance change of the liquid crystal display element cell 37 of the observation example 3. The time constant of the liquid crystal display element cell 37 was 40 ms, the time constant of the light switching element was 25.2 ms during non-irradiation with light and 4.2 ms during irradiation with light.

In FIG. 11, the white rhomboid curve shows the reflectance change characteristic during non-irradiation with light and the black square curve shows the reflectance change characteristic during irradiation with light.

As obvious from FIG. 11, the liquid crystal display element cell 37 has a threshold value around 390 V during non-irradiation with light, and has the first threshold value around 240 V and the second threshold value around 280 V during irradiation with light. Therefore, the reflectance is equal to or higher than approximately 20% during irradiation with light in the range from 240 V to 280 V and the display is turned on, and on the other hand the reflectance is equal to or lower than approximately 3% during non-irradiation with light and the display is turned off. The first threshold value and the second threshold value described hereinabove indicate the threshold value of the liquid crystal display element cell 37 itself, the second threshold value of the liquid crystal display element cell 37 is the threshold value that appears because the liquid crystal display element cell 37 is connected electrically in series to the organic photoconductive switching element cell 35, and this threshold value is the third threshold value of the photo-addressable type recording display medium.

Furthermore, in the range from approximately 280 V to 390 V, the reflectance is equal to or lower than 3% both during non-irradiation with light and during irradiation with light and the display is turned off, however, in the range higher approximately 390 V, the reflectance is equal to or higher than 20% during non-irradiation with light and the display is turned on, and the reflectance is approximately equal to or lower than 3% during irradiation with light and the display is turned off.

In other words, only by changing the magnitude of the applied voltage, the recording can be switched between negative recording and positive recording.

(2) Example 3

In the present example 3, the switching element cell formed of organic photoconductive material was prepared as a light switching element to evaluate the waveform observed when AC voltage was applied. Furthermore, the memory display element and the switching element formed of organic photoconductive material were combined as a unified element, and an apparatus that was to be used for confirming the capability of image displaying was fabricated.

Benzimidazole perylene (BZP) was vapor-deposited on a transparent substrate having an ITO film in the same manner as used in the example 1 to form a film having a film thickness of approximately 0.02 $\mu$m as a charge generation layer, and this film was used as the under side charge generation layer 42. Next, a charge transport film having a film thickness of approximately 3 $\mu$m was formed as a charge transfer layer in the same manner as used in the example 1, and this film was used as the charge transport layer 44.

Furthermore, on the upper layer of the charge transport layer 44, a BZP film having a film thickness of approximately 0.02 $\mu$m was formed in the same manner as used for preparation of the above-mentioned under side charge generation layer 42, and this BZP film was served as the upper side charge generation layer 46. As the result, the organic photoconductive switching element layer 34 having the dual CGL structure was formed.

Furthermore, on the upper layer of the upper side charge generation layer 46, a metal-oxide shading film containing polyvinylalcohol binder having a film thickness of approximately 1 $\mu$m was coated and dried by spin coat method to form the shading layer 39c.

Furthermore, on the upper layer of the shading layer 39c, an OPC liquid crystal cell frame was formed in the same manner as used in the example 1, cholesteric liquid crystal, that selectively reflects blue color light, having the same composition as used in the above-mentioned observation example 1 was injected in the OPC liquid crystal cell frame to form the liquid crystal display element layer 36.

The spatial light modulation element 20 having the structure as described hereinabove was connected to the connector 28 as shown in FIG. 8, a monochromatic equivalent type TFT liquid crystal 24 was placed in contact closely in order to enter an image, and the spatial light modulation element 20 was irradiated with the pattern light from the image of the TFT liquid crystal 24. Simultaneously, 4 rectangular waveform pulses of 50 Hz and 300 V was applied by the driving pulse generation unit 29, and an image was formed on the spatial light modulation element 20. The intensity of the light from the halogen light source 26 was adjusted so that the irradiation area of the organic photoconductive switching element layer 34 was irradiated with the light quantity of 100 $\mu$W/cm$^2$ and the non-irradiation area was irradiated with the light quantity of 1 nW/cm$^2$.

(3) Comparative Example 3

The above-mentioned comparative example 1 was used as the comparative example 3.

(4) Evaluation 3

Though the recording was possible in the observation example 3 and also in the comparative example 3, the light quantity of 100 $\mu$W/cm$^2$ was sufficient for recording in the case of the observation example 3, that is, the observation example 3 was highly sensitive, on the other hand the light quantity of 10 mW/cm$^2$ was required for recording in the case of the comparative example 3. From this result, it was found that the sensitivity was significantly improved.

Therefore, in the example 3 in which the liquid crystal display element cell 37 and the organic photoconductive switching element cell 35 of the observation example 3 were combined to form a unified component, the light quantity of 100 $\mu$W/cm$^2$ was sufficient to record a desired image as in the case of the observation example 3. The recording display did not exhibit deterioration even after 1000 cycle repetition.

As described hereinabove, according to the present invention, the effect that the high sensitivity recording display is realized and the recording display is realized with short writing pulse application time is obtained.

Furthermore, the effect that the switching between the positive display and the negative display is realized easily is obtained.

The entire disclosure of Japanese Patent Application No. 2000-177295 filed on Jun. 13, 2000 including specification, claims, drawings and abstract is incorporated herein by reference in its entirety.

What is claimed is:

1. A photo-addressable type recording display apparatus comprising:

a photo-addressable type recording display medium provided with a memory display element layer having a predetermined impedance and a light switching element layer having an impedance that is variable depending on irradiation with light laminated on the display element layer and electrically connected in series to the display element layer;

a pattern light irradiation source that irradiates the photo-addressable type recording display medium with a pattern light that has been converted corresponding to image information;

a pulse voltage application part that applies a predetermined pulse voltage to the photo-addressable type recording display medium; and a driving control part that controls the pulse voltage applied by the pulse voltage application part in accordance with a result of comparison between the predetermined impedance of the display element layer and the impedance of the light switching element layer varied depending on the quantity of light from the pattern light irradiation source for controlling a pulse waveform and a voltage amplitude of the voltage applied to the display element layer, thereby controlling the display state of the photo-addressable type recording display medium.

2. The photo-addressable type recording display apparatus as claimed in claim 1, wherein the result of comparison between the impedance of the display element layer and the impedance of the light switching element layer is varied by controlling a time constant of at least one of the display element layer and the light switching element layer.

3. The photo-addressable type recording display apparatus as claimed in claim 2, wherein the light switching element layer is formed of photoconductive material, and the driving control part controls the quantity of light from the pattern light irradiation source and thereby controls the quantity of charge generated in the light switching element layer corresponding to the light quantity to thereby change a resistance component of the switching element layer, and resultantly controls the time constant.

4. The photo-addressable type recording display apparatus as claimed in claim 2, wherein the photo-addressable type recording display medium has a time constant of the light switching element layer that is extremely larger than a time constant of the display element layer during non-irradiation with light, and a time constant of the light switching element layer is approximately equal to or smaller than a time constant of the display element layer during irradiation with light, and the driving control part controls the voltage applied to the photo-addressable type recording display medium so that an applied voltage equal to or higher than a threshold value is applied to the display element layer for a duration that is sufficiently long to change the phase of the display element layer during non-irradiation with light, and so that the voltage of the display element layer is suppressed to a value lower than the threshold value, or the voltage of the display element layer is suppressed to a value equal to or lower than the threshold voltage due to the waveform transformation during irradiation with light.

5. The photo-addressable type recording display apparatus as claimed in claim 2, wherein the photo-addressable type recording display medium has a time constant of the light switching element layer that is larger than a time constant of the display element layer during non-irradiation with light, and the time constant of the light switching element layer is approximately equal to or smaller than the time constant of the display element layer during irradiation with light, and the driving control part controls the voltage applied to the photo-addressable type recording display medium so that a voltage higher than a threshold voltage having an amplitude that is sufficiently long to change the phase is being always applied to the display element layer, and so that a voltage equal to or higher than the threshold value is applied to the display element layer for a duration that is sufficiently long to change the phase during irradiation with light and a voltage having a voltage amplitude and duration of application that are necessary for the display element layer to be turned off by a voltage drop from an amplitude equal to or lower than the threshold value to a voltage being turned off is applied during non-irradiation with light.

6. The photo-addressable type recording display apparatus as claimed in claim 2, wherein the photo-addressable type recording display medium has a time constant of the light switching element layer that is approximately equal to a time constant of the display element layer during non-irradiation with light, and the time constant of the light switching element layer is smaller than the time constant of the display element layer during irradiation with light, and the driving control part controls the voltage applied to the photo-addressable type recording display medium so that a voltage equal to or higher than a threshold value is applied to the display element layer for a duration that is sufficiently long to change the phase during non-irradiation with light, and so that a voltage having an amplitude effectively equal to or lower than the threshold voltage is applied to the display element layer due to the waveform transformation during irradiation with light.

7. The photo-addressable type recording display apparatus as claimed in claim 2, wherein the photo-addressable type recording display medium has a time constant of the light switching element layer that is approximately equal to a time constant of the display element layer during non-irradiation with light, and the time constant of the light switching element layer is smaller than the time constant of the display element layer during irradiation with light, and the driving control part controls the voltage applied to the photo-addressable type recording display medium so that a voltage equal to or lower than a threshold voltage is applied to the display element layer during non-irradiation with light, and so that a voltage equal to or higher than the threshold value is applied to the display element layer for a duration that is sufficiently long to change the phase of the display element layer during irradiation with light.

8. The photo-addressable type recording display apparatus as claimed in claim 2, wherein the photo-addressable type recording display medium has a time constant of the light switching element layer that is larger than a time constant of the display element layer both during non-irradiation with light and during irradiation with light, and the driving control part controls the voltage applied to the photo-addressable type recording display medium so that a voltage is applied to the display element layer for a duration that is shorter than a duration to change the phase of the display element layer or a voltage smaller than the threshold value is applied to the display element layer during non-irradiation with light, and controls so that a voltage equal to or higher than the threshold value is applied to the display element layer for a duration that is sufficiently long to change the phase of the display element layer during irradiation with light.

9. The photo-addressable type recording display apparatus as claimed in claim 2, wherein the photo-addressable type recording display medium has a time constant of the display element layer that is larger than a time constant of the light switching element layer during both non-irradiation with light and irradiation with light, and the driving control part controls an amplitude and application duration of the voltage applied to the photo-addressable type recording display medium so that the display of the display element layer is turned off by the voltage drop from an amplitude equal to or lower than a threshold value to a voltage being turned off during non-irradiation with light, and so that a voltage equal to or higher than the threshold value is applied to the display element layer for a duration that is sufficiently long to change the phase of the display element layer during irradiation with light.

10. The photo-addressable type recording display apparatus as claimed in claim 2, wherein the photo-addressable type recording display medium has a time constant of the light switching element layer that is smaller than the time constant of the display element layer during both non-irradiation with light and irradiation with light, and the driving control part controls the voltage applied to the photo-addressable type recording display medium so that a voltage is applied to the display element layer for a duration that is shorter than a duration to change the phase of the display element layer or a voltage smaller than a threshold value is applied to the display element layer during non-irradiation with light, and so that a voltage equal to or higher than the threshold value is applied to the display element layer during irradiation with light.

11. The photo-addressable type recording display apparatus as claimed in claim 2, wherein the photo-addressable type recording display medium has a time constant of the display element layer that is smaller than a time constant of the light switching element layer during both non-irradiation with light and irradiation with light, and the driving control part controls the voltage applied to the photo-addressable type recording display medium so that a voltage equal to or higher than a threshold value that is sufficiently high to change the phase of the display element layer is applied to the display element layer during non-irradiation with light, and so that a voltage having an amplitude equal to or lower than the threshold voltage is applied to the display element layer due to the waveform transformation caused after the voltage is turned off during irradiation with light.

12. The photo-addressable type recording display apparatus as claimed in claim 2, wherein the photo-addressable type recording display medium has a time constant of the light switching element layer that is larger than a time constant of the display element layer during non-irradiation with light, and the time constant of the light switching element layer is smaller than the time constant of the display element layer during irradiation with light, and the driving control part controls the voltage applied to the photo-addressable type recording display medium so that a voltage equal to or higher than a threshold value is applied to the display element layer for a duration that is sufficiently long to change the phase of the display element layer during both non-irradiation with light and irradiation with light, and so that a voltage having an amplitude effectively equal to or lower than the threshold voltage is applied to the display element layer due to the waveform transformation caused after the voltage drops to an amplitude equal to or lower than the threshold value during irradiation with light.

13. The photo-addressable type recording display apparatus as claimed in claim 2, wherein the photo-addressable type recording display medium has a time constant of the light switching element layer that is larger than a time constant of the display element layer during non-irradiation with light, and the time constant of the light switching element layer is smaller than the time constant of the display element layer during irradiation with light, and the driving control part controls the voltage applied to the photo-addressable type recording display medium so that a voltage is applied to the display element layer for a duration that is shorter than a duration to change the phase of the display element layer or a voltage smaller than a threshold value is applied to the display element layer during non-irradiation with light, and so that a voltage equal to or higher than the threshold value is applied to the display element layer during irradiation with light.

14. The photo-addressable type recording display apparatus as claimed in claim 2, wherein the photo-addressable type recording display medium has a time constant of the light switching element layer that is larger than a time constant of the display element layer during non-irradiation with light, and the time constant of the light switching element layer is smaller than the time constant of the display element layer during irradiation with light, and the driving control part controls the voltage applied to the photo-addressable type recording display medium so that a voltage equal to or higher than the threshold value is applied to the display element layer for a duration that is sufficiently long to change the phase of the display element layer by overshooting caused while the voltage is being turned off during non-irradiation with light, and so that a voltage arising from overshooting caused while the voltage is being turned off, the voltage being lower than the voltage necessary to change the phase of the display element layer, or so that a voltage is applied to the display element layer for a duration that is shorter than a duration to change the phase during irradiation with light.

15. The photo-addressable type recording display apparatus as claimed in claim 2, wherein the photo-addressable type recording medium comprises a display element layer having a first threshold value at which the display is turned off and a second threshold value at which the display is turned on when a voltage equal to or higher than the first threshold value is applied, and has a time constant of the light switching element layer that is larger than a time constant of the display element layer during non-irradiation with light, and the time constant of the light switching element layer is smaller than the time constant of the display element layer during irradiation with light, and the driving control part controls the voltage applied to the photo-addressable type recording display medium so that a voltage arising from overshooting caused while the voltage is being turned off is applied to the display element layer during non-irradiation with light, the voltage being equal to or higher than the first threshold value and equal to or lower than the second threshold value, and so that a voltage equal to or higher than the second threshold value is applied to the display element layer during irradiation with light.

16. The photo-addressable type recording display apparatus as claimed in claim 1, wherein the display element layer comprises any one of a polymer network stabilized liquid crystal element, polymer dispersion liquid crystal element, and capsulated liquid crystal element that are formed of cholesteric liquid crystal.

17. The photo-addressable type recording display apparatus as claimed in claim 1, wherein the switching element layer is formed of organic photoconductive material.

* * * * *